(12) United States Patent
Imafuku et al.

(10) Patent No.: US 8,280,620 B2
(45) Date of Patent: Oct. 2, 2012

(54) POSITION CALCULATING METHOD AND POSITION CALCULATING DEVICE

(75) Inventors: Shigeru Imafuku, Nagano (JP); Kumar Anand, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 12/613,010

(22) Filed: Nov. 5, 2009

(65) Prior Publication Data

US 2010/0121573 A1 May 13, 2010

(30) Foreign Application Priority Data

Nov. 11, 2008 (JP) .................................. 2008-288528

(51) Int. Cl.
G05D 1/02 (2006.01)
(52) U.S. Cl. ........................................................ 701/300
(58) Field of Classification Search .................... 701/300
See application file for complete search history.

(56) References Cited

U.S. PATENT DOCUMENTS

| | | | |
|---|---|---|---|
| 4,680,715 A | 7/1987 | Pawelek | |
| 5,865,665 A * | 2/1999 | Yueh | 451/5 |
| 6,424,914 B1 * | 7/2002 | Lin | 701/470 |
| 6,459,990 B1 * | 10/2002 | McCall et al. | 701/501 |
| 6,671,622 B2 * | 12/2003 | McCall et al. | 701/501 |
| 2010/0211315 A1 * | 8/2010 | Toda | 701/216 |

* cited by examiner

*Primary Examiner* — Hussein A. Elchanti
(74) *Attorney, Agent, or Firm* — Global IP Counselors, LLP

(57) ABSTRACT

A position calculating method performed by a position calculating device having a sensor unit carried by or mounted on a mobile body and moving with the mobile body, includes: calculating the position of the mobile body; setting a detection value agreement range of the sensor unit for each of the possibility of moving, possibility of uncertainty, and possibility of stopping of the mobile body, and setting the detection value agreement range of the possibility of moving as the widest range to establish a membership function; determining whether the mobile body is in the stopping condition by predetermined fuzzy inference calculation using the membership function; changing an error parameter used for predetermined Kalman filter process to correct the calculated position by the Kalman filter process according to whether the stopping condition of the mobile body is determined or not; and correcting the calculated position by the Kalman filter process.

8 Claims, 26 Drawing Sheets

| RULE NO. | FIRST PART | | | SECOND PART |
| --- | --- | --- | --- | --- |
| | AJx | AJy | AJz | |
| 1 | HIGH | — | — | MOVE |
| 2 | — | HIGH | — | MOVE |
| 3 | — | — | HIGH | MOVE |
| 4 | MIDDLE | MIDDLE | MIDDLE | MOVE |
| 5 | MIDDLE | MIDDLE | LOW | UNCERTAIN |
| 6 | MIDDLE | LOW | MIDDLE | UNCERTAIN |
| 7 | MIDDLE | LOW | LOW | UNCERTAIN |
| 8 | LOW | MIDDLE | MIDDLE | UNCERTAIN |
| 9 | LOW | MIDDLE | LOW | UNCERTAIN |
| 10 | LOW | LOW | MIDDLE | UNCERTAIN |
| 11 | LOW | LOW | LOW | STOP |

| CONDITION NO. | CONDITION | DETERMINATION RESULT |
|---|---|---|
| 1 | OUTPUT ≥ 0.95 | MOVE |
| 2 | OUTPUT ≤ 0.05 | STOP |
| 3 | 0.05<OUTPUT<0.95 & LAST DETERMINATION RESULT: MOVE | MOVE |
| 4 | 0.05<OUTPUT<0.95 & LAST DETERMINATION RESULT: STOP | STOP |

FIG. 8

| RULE NO. | FIRST PART | | | SECOND PART |
|---|---|---|---|---|
| | AJx | AJy | AJz | |
| 1 | HIGH | — | — | MOVE |
| 2 | — | HIGH | — | MOVE |
| 3 | — | — | HIGH | MOVE |
| 4 | MIDDLE | MIDDLE | MIDDLE | MOVE |
| 5 | MIDDLE | MIDDLE | LOW | UNCERTAIN |
| 6 | MIDDLE | LOW | MIDDLE | UNCERTAIN |
| 7 | MIDDLE | LOW | LOW | UNCERTAIN |
| 8 | LOW | MIDDLE | MIDDLE | UNCERTAIN |
| 9 | LOW (=0.23) | MIDDLE (=0.25) | LOW (=0.24) | UNCERTAIN |
| 10 | LOW | LOW | MIDDLE | UNCERTAIN |
| 11 | LOW (=0.23) | LOW (=0.1) | LOW (=0.24) | STOP |

PROSPECTIVE VALUE: 0, 0, 0, 0, 0, 0, 0, 0.23, 0, 0.1

(MINIMUM arrows at rule 9 → 0.23 and rule 11 → 0.1)

ACCUMULATION VALUE:
- MAXIMUM → 0 (MOVE=0)
- MAXIMUM → 0.23 (UNCERTAIN=0.23)
- MAXIMUM → 0.1 (STOP=0.1)

| NO. 8251 | CONDITION 8253 | DETERMINATION RESULT 8255 |
|---|---|---|
| 1 | OUTPUT ≥ 0.95 | ROTATE |
| 2 | OUTPUT ≤ 0.05 | LINEAR MOVE |
| 3 | 0.05<OUTPUT<0.95 | UNCERTAIN (SAME DETERMINATION RESULT AS LAST DETERMINATION RESULT) |

| DETECTION TIME [ms] 9011 | ACCELERATION 9013 | ANGULAR SPEED 9015 | AZIMUTH 9017 |
|---|---|---|---|
| t1 | (Ax1,Ay1,Az1) | (ωx1,ωy1,ωz1) | Heading1 |
| t2 | (Ax2,Ay2,Az2) | (ωx2,ωy2,ωz2) | Heading2 |
| t3 | (Ax3,Ay3,Az3) | (ωx3,ωy3,ωz3) | Heading3 |
| ⋮ | ⋮ | ⋮ | ⋮ |

NEW ↑ / OLD ↓

| CAPTURE SATELLITE | MEASUREMENT ACTUAL VALUE |
|---|---|
| S1 | (Freq1,CP1) |
| S2 | (Freq2,CP2) |
| S3 | (Freq3,CP3) |
| ⋮ | ⋮ |

FIG.16

| POSITION CALCULATION TIME [s] | EAST POSITION | NORTH POSITION | EAST MOVING SPEED | NORTH MOVING SPEED | MOVING SPEED ON POSITION CALCULATION PLANE |
|---|---|---|---|---|---|
| T1 | EastPos1 | NorthPos1 | EastVel1 | NorthVel1 | Speed1 |
| T2 | EastPos2 | NorthPos2 | EastVel2 | NorthVel2 | Speed2 |
| T3 | EastPos3 | NorthPos3 | EastVel3 | NorthVel3 | Speed3 |
| ... | ... | ... | ... | ... | ... |

NEW ←→ OLD

FIG.17

POSITION CALCULATING METHOD AND POSITION CALCULATING DEVICE

The entire disclosure of Japanese Patent Application No. 2008-288528, filed Nov. 11, 2008 is expressly incorporated by reference herein.

BACKGROUND

1. Technical Field

The present invention relates to a position calculating method and a position calculating device.

2. Related Art

A GPS (global positioning system) is widely known as a positioning system using positioning signals. The GPS is included in a position calculating device contained in a cellular phone, a car navigation device, or other units. The GPS performs position calculation for obtaining three-dimensional coordinates indicating the position of the GPS and time errors based on information about positions of plural GPS satellites and pseudo distances between the plural GPS satellites and the GPS.

For calculating positions, position calculation by least squared method and position calculation using Kalman filter are known. As a technology associated with the Kalman filter, a method which estimates the condition of the position calculating device by using the moving speed and azimuth of the position calculating device detected by a speed sensor and an azimuth sensor as inputs to the Kalman filter has been disclosed in U.S. Pat. No. 4,680,715.

According to the position calculation using Kalman filter in related art, calculation is generally performed using fixed parameters. However, when the position calculating device is included in an electronic device such as a cellular phone and a car navigation system, the position calculating device constantly changes movement condition in various ways such as stop, rotation, acceleration, and deceleration since the user carrying the cellular phone or the automobile containing the car navigation system are movable.

Thus, when position calculation is performed using fixed parameters, such phenomena as "position lag" in which the times of the calculated positions obtained by position calculation lag the times of the actual positions, "position lead" in which the times of the calculated positions obtained by position calculation lead the times of the actual positions, and "position jump" in which calculated positions largely deviate from the actual positions are produced. In this case, accuracy in position calculation lowers.

SUMMARY

It is an advantage of some aspects of the invention to provide a technology capable of improving accuracy in position calculation using Kalman filter process.

A first aspect of the invention is directed to a position calculating method performed by a position calculating device carried by or mounted on a mobile body and moving with the mobile body which includes: calculating the position of the mobile body; setting a detection value agreement range of the sensor unit for each of the possibility of moving, possibility of uncertainty, and possibility of stopping of the mobile body, and setting the detection value agreement range of the possibility of moving as the widest range to establish a membership function; determining whether the mobile body is in the stopping condition by predetermined fuzzy inference calculation using the membership function; changing an error parameter used for predetermined Kalman filter process to correct the calculated position by the Kalman filter process according to whether the stopping condition of the mobile body is determined or not; and correcting the calculated position by the Kalman filter process.

Another aspect of the invention is directed to a position calculating device carried by or mounted on a mobile body and moving with the mobile body which includes: a calculating unit which calculates the position of the mobile body; a sensor unit which includes at least an acceleration sensor; a membership function setting unit which sets a detection value agreement range of the sensor unit for each of the possibility of moving, possibility of uncertainty, and possibility of stopping of the mobile body, and setting the detection value agreement range of the possibility of moving as the widest range to establish a membership function; a determining unit which determines whether the mobile body is in the stopping condition by predetermined fuzzy inference calculation using the membership function; a changing unit which changes an error parameter used for predetermined Kalman filter process to correct the position by the calculating unit by the Kalman filter process according to whether the stopping condition of the mobile body is determined or not; and a correcting unit which corrects the position calculated by the calculating unit by the Kalman filter process.

According to the first and another aspect of the invention, the detection value agreement range of the sensor unit is set for each of the possibility of moving, possibility of uncertainty, and possibility of stopping of the mobile body, and the detection value agreement range of the possibility of moving is set as the widest range to establish a membership function. Then, whether the mobile body is in the stopping condition or not is determined by the predetermined fuzzy inference calculation using the membership function. The calculated position of the mobile body is corrected by Kalman filter process. The error parameter used in the Kalman filter process is changed according to the above determination whether the mobile body is in the stopping condition or not.

In the fuzzy inference calculation, the membership function having the detection value agreement range for the possibility of moving as the widest range is used based on the consideration that the moving condition of the mobile body occurs more frequently than the stopping condition. Whether the mobile body is in the stopping condition or not can be adequately determined by performing the fuzzy inference calculation according to the detection result of the sensor unit. Then, the error parameter used for the Kalman filter process is changed when the determination that the mobile body is in the stopping condition is made. By this method, highly accurate position calculation corresponding to the situation whether the mobile body is in the stopping condition or not can be achieved by performing the Kalman filter process using the error parameters suitable for the stopping condition.

A second aspect of the invention is directed to the position calculating method of the first aspect, wherein determining whether the mobile body is in the stopping condition or not is determined based on the estimation whether the mobile body is continuously in the stopping condition or not when the predetermined fuzzy inference calculation is repeatedly executed.

According to the second aspect of the invention, it is determined whether the mobile body is in the stopping condition or not based on the estimation that the mobile body is continuously in the stopping condition when the fuzzy inference calculation is repeatedly performed. By this method, accuracy in the determination that the mobile body is in the stopping condition can be increased.

A third aspect of the invention is directed to the position calculating method of the first or the second aspect which further includes determining the gravity direction based on the detection value of the sensor unit when the mobile body is in the stopping condition.

According to the third aspect of the invention, the gravity direction is determined based on the detection value of the sensor unit when the mobile body is in the stopping condition. Under the stopping condition of the mobile body, the possibility that the direction of the largest acceleration detected by the acceleration sensor is the gravity direction is the highest. Thus, the gravity direction can be appropriately determined based on the detection value of the sensor unit.

A fourth aspect of the invention is directed to the position calculating method of any of the first through third aspects, wherein the sensor unit has a gyro sensor; and the method further includes determining whether the mobile body is in the rotating condition or not based on the detection result of the sensor unit, and changing the error parameter according to the determination whether the mobile body is in the rotating condition.

According to the fourth aspect of the invention, whether the mobile body is in the rotating condition or not is determined based on the detection result of the sensor unit including the gyro sensor, and the error parameter is changed according to the determination result whether the mobile body is in the rotating condition or not. For example, when the mobile body is in the rotating condition, it is preferable that the error parameter for the azimuth is set smaller than that when the mobile body is not in the rotating condition based on the estimation that the azimuth has small error.

A fifth aspect of the invention is directed to the position calculating method of the fourth aspect, wherein the gyro sensor detects a plurality of rotation angles including the rotation angle in the yaw direction of the mobile body; the method further includes setting the agreement range of the rotation angle detection value of the gyro sensor for each of the possibility of rotating, possibility of uncertainty, possibility of linearly moving of the mobile body and setting the agreement range of the rotation angle detection value in the yaw direction for the possibility of rotating as the widest range to set membership function for rotation determination; and determining whether the mobile body is in the rotating condition or not includes determining whether the mobile body is in the rotating condition or not based on predetermined fuzzy inference calculation using the membership function for rotation determination.

According to the fifth aspect of the invention, the gyro sensor detects the plural rotation angles including the rotation angle of the mobile body in the yaw direction. Then, the agreement range of the rotation angle detection value of the gyro sensor is set for each of the possibility of rotating, possibility of uncertainty, possibility of linearly moving of the mobile body, and the agreement range of the rotation angle detecting value in the yaw direction for the possibility of rotating is set as the widest range to set membership function for rotation determination. Subsequently, whether the mobile body is in the rotating condition or not is determined based on the predetermined fuzzy inference calculation using the membership function for rotation determination.

In most cases, the mobile body is considered to rotate around the yaw axis. Thus, the agreement range of the rotation angle detection value in the yaw direction is set as the widest range for the possibility of rotating such that the condition that the mobile body is rotating can be easily determined when the mobile body is rotating around the yaw axis.

A sixth aspect of the invention is directed to the position calculating method of any of the first through fifth aspects, wherein the acceleration sensor detects at least acceleration in the front direction of the mobile body; and the method further includes determining acceleration and deceleration of the mobile body and the level of the acceleration and deceleration based on the acceleration in the front direction detected by the acceleration sensor, and changing the error parameter according to the acceleration and deceleration of the mobile body and the level of the acceleration and deceleration.

According to the sixth aspect of the invention, the acceleration sensor detects at least acceleration in the front direction of the mobile body. Then, acceleration and deceleration of the mobile body and the level of the acceleration and deceleration are determined based on the acceleration in the front direction detected by the acceleration sensor, and the error parameter is changed according to the acceleration and deceleration of the mobile body and the level of the acceleration and deceleration. For example, the mobile body is in high acceleration condition when the acceleration in the front direction exceeds a threshold. In this case, it is preferable that the error parameter for the moving speed is changed to a larger value based on the estimation that the error for the moving speed is large.

A seventh aspect of the invention is directed to the position calculating method of the sixth aspect which further includes: calibrating the acceleration detection value in the front direction of the acceleration sensor when it is determined that the mobile body is in the stopping condition.

According to the seventh aspect of the invention, the acceleration detection value in the front direction of the acceleration sensor is calibrated when it is determined that the mobile body is in the stop condition. When the mobile body stops, the acceleration of the mobile body in the front direction becomes zero. Thus, the acceleration detection value is calibrated when determination that the mobile body is in the stopping condition is made.

BRIEF DESCRIPTION OF THE DRAWINGS

The invention will be described with reference to the accompanying drawings, wherein like numbers reference like elements.

FIG. 6 shows an example of data structure of a stop determination fuzzy rule.

FIG. 8 shows an example of table structure of a stop determination result table.

FIG. 10 shows the stop determining process.

FIG. 14 shows an example of table structure of a rotation determination result table.

FIG. 15 shows an example of data structure of sensor data.

FIG. 16 shows an example of data structure of measurement data.

FIG. 17 shows an example of data structure of measurement history data.

DESCRIPTION OF EXEMPLARY EMBODIMENT

A cellular phone as one type of electronic system including a position calculating device according to an embodiment of the invention is hereinafter described with reference to the drawings. The cellular phone carried by a user or mounted on an automobile or the like is movable. In this embodiment, a person or an object carrying or including the cellular phone is referred to as "mobile body", and various directions to be detected by the cellular phone correspond to the directions of the mobile body. Obviously, the invention is applicable to examples other than the embodiment described herein.

1. General Structure

Figure 1:
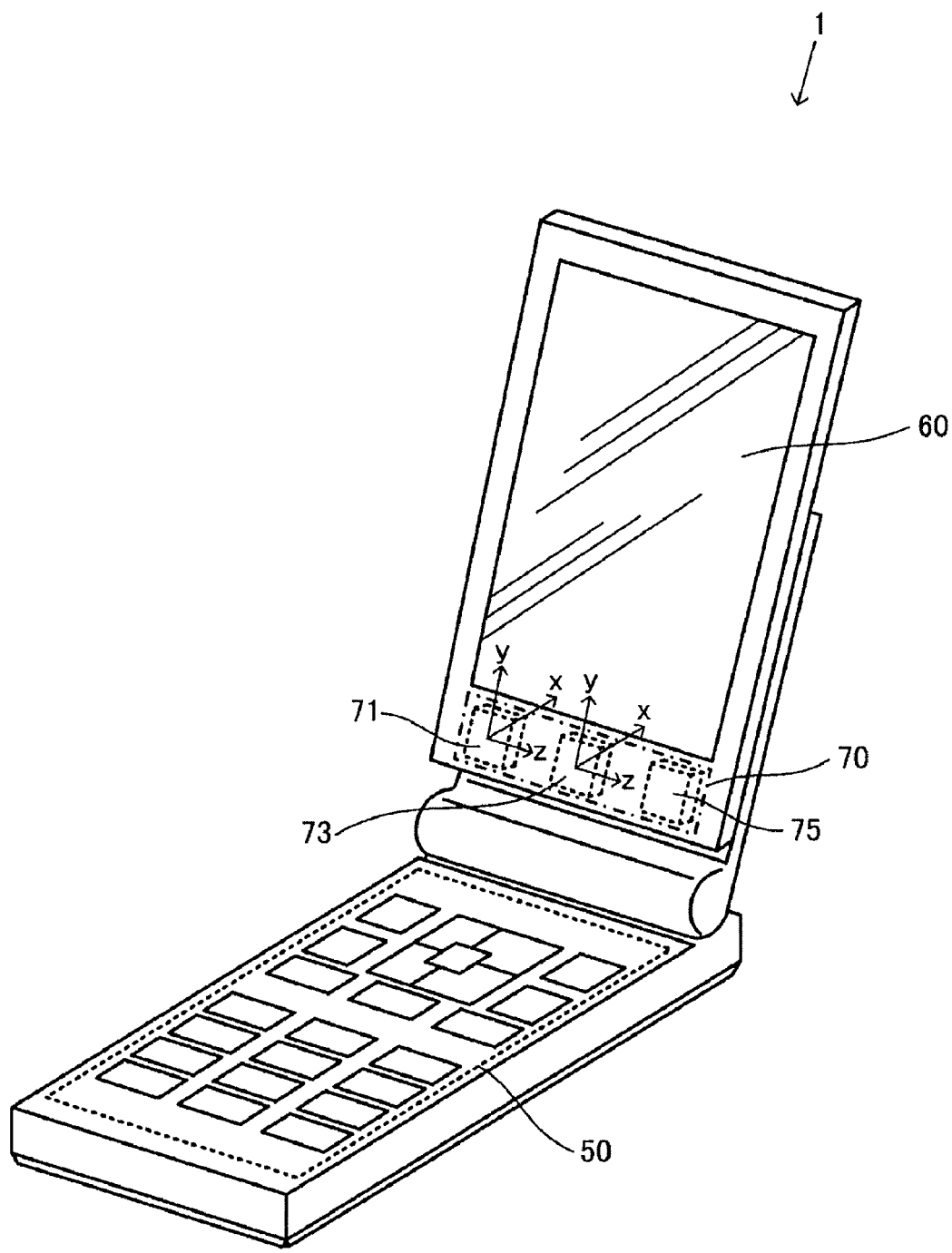
FIG. 1 illustrates a general external appearance of a cellular phone.
Figure 2:
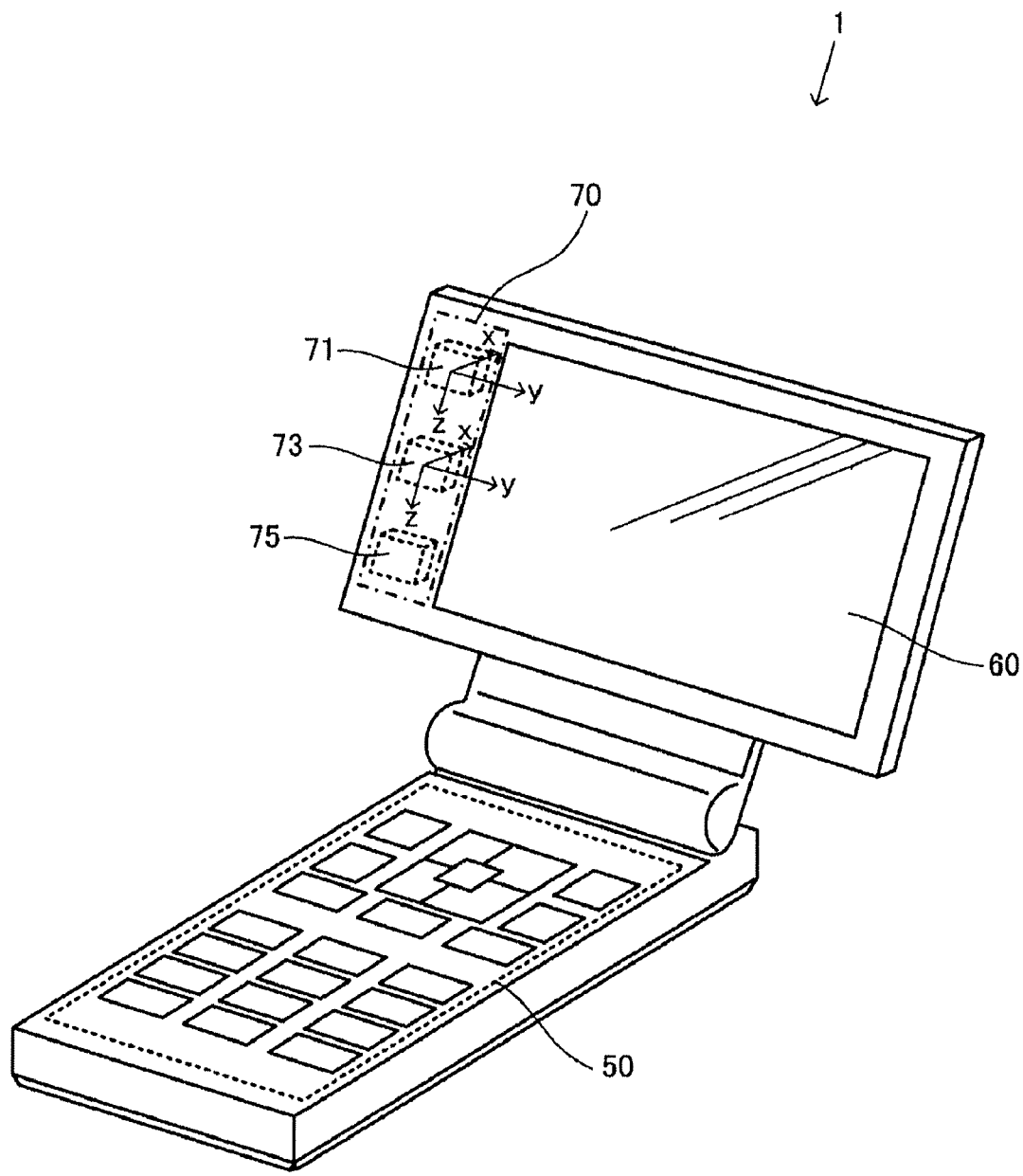
FIG. 2 illustrates a general external appearance of the cellular phone.

FIGS. 1 and 2 illustrate a general external appearance of a cellular phone 1. The cellular phone 1 is a folding type cellular phone having a display unit 60 combined with a cover unit as one body. A user of the cellular phone 1 can see the screen of the display unit 60 disposed in either the longitudinal or lateral position by rotating the cover unit such that the display surface is revolved clockwise or anticlockwise with the cover unit opened. The cellular phone 1 performs position calculation for calculating the position of the cellular phone 1 according to the user's operation inputted through an operation unit 50, and displays the calculated position on the display unit 60.

The cover unit contains a sensor unit 70 having an acceleration sensor 71, a gyro sensor 73, and an azimuth sensor 75. The acceleration sensor 71 is a triaxial acceleration sensor which has right-handed orthogonal triaxial coordinate system (local coordinate system) providing "x axis" in the front-rear direction, "y axis" in the up-down direction, and "z axis" in the left-right direction with respect to the display unit 60 when the display unit 60 is disposed in the longitudinal position (FIG. 1). The gyro sensor 73 is an angle speed sensor capable of detecting angular speed around the three axes. The gyro sensor 73 has a similar coordinate system as that of the acceleration sensor 71.

The cellular phone 1 determines the moving condition of the cellular phone 1 as the mobile body (such as stop, rotation, acceleration and deceleration conditions) by fuzzy inference calculation based on the detection result of the sensor unit 70. In this case, the direction of the coordinate system of the sensor unit 70 with respect to the earth changes depending on whether the display unit 60 is disposed in the longitudinal direction or the lateral direction. In this embodiment, therefore, it is determined which axis of the detection axes associated with the sensor unit 70 corresponds to each of the axis in the gravity direction (hereinafter referred to as "gravity axis") and the axis in the front direction (hereinafter referred to as "front axis") of the cellular phone 1 as the mobile body when determination that the mobile body is in the stopping condition is made. Then, the respective axes are defined based on the judgment result to determine the rotation condition and acceleration/deceleration condition of the mobile body. That is, judgment of the respective axes is equivalent to judgment of the relative attitude of the cellular phone 1.

In the following description, the front axis corresponds to "X axis", the gravity axis corresponds to "Z axis", and the axis orthogonal to the front axis and the gravity axis corresponds to "Y axis", which are expressed separately from the three axes "z axis", "y axis", and "z axis" of the local coordinate system associated with the cellular phone 1.

2. Function Structure

Figure 3:
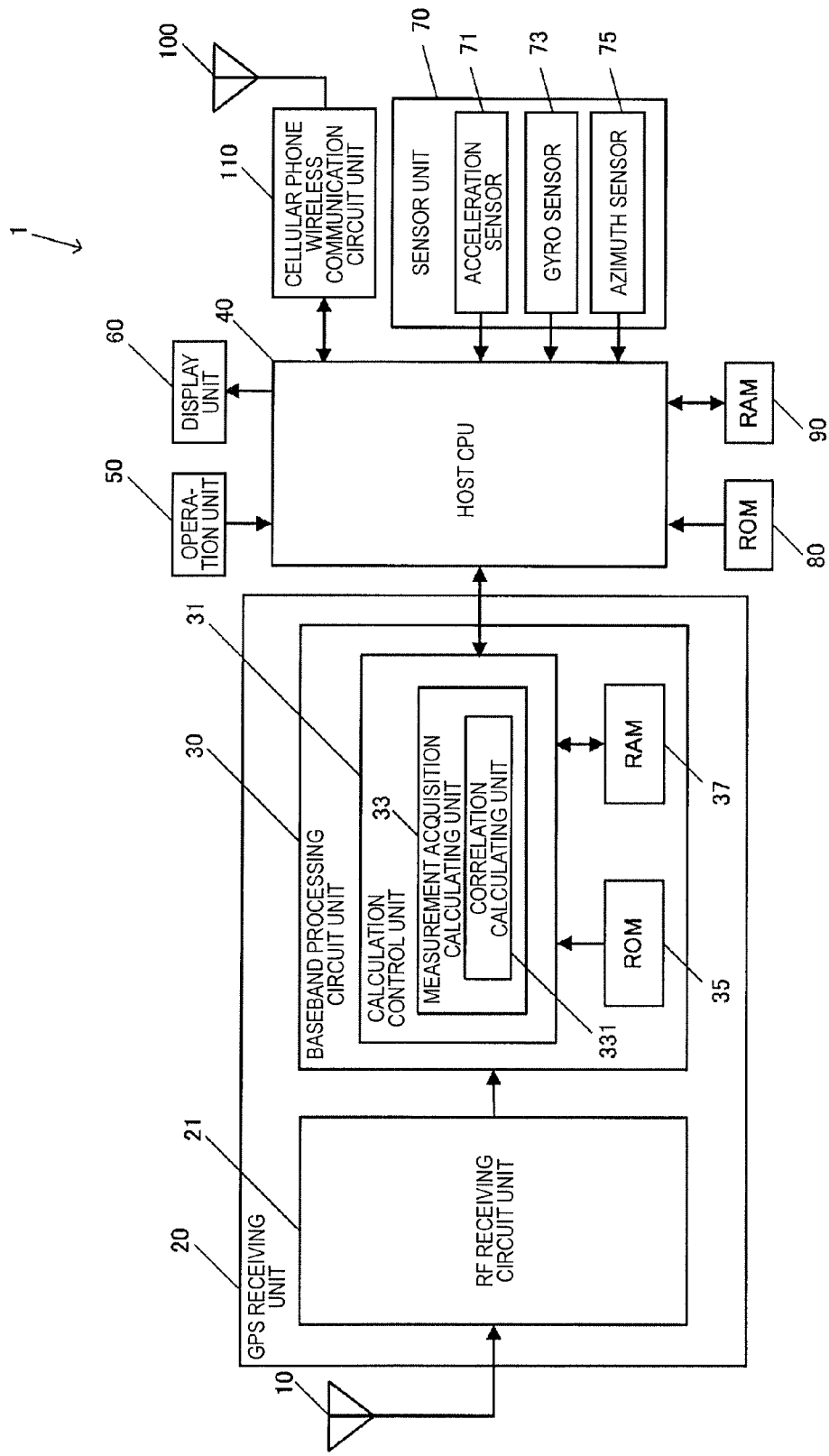
FIG. 3 is a block diagram showing a function structure of the cellular phone.

FIG. 3 is a block diagram showing the function structure of the cellular phone 1. The cellular phone 1 includes a GPS antenna 10, a GPS receiving unit 20, a host CPU (central processing unit) 40, an operation unit 50, a display unit 60, a sensor unit 70, a ROM (read only memory) 80, a RAM (random access memory) 90, a cellular phone antenna 100, and a cellular phone wireless communication circuit unit 110.

The GPS antenna 10 is an antenna which receives RF (radio frequency) signals containing GPS satellite signals transmitted from GPS satellites and outputs received signals to the GPS receiving unit 20. GPS satellite signals are communication signals having 1.57542 GHz modulated by direct spectrum diffusion system using PRN (pseudo random noise) codes as one type of diffusion codes different for each satellite. The PRN codes are pseudo random noise codes having repetitive cycle of 1 ms and code length of 1,023 chips for 1PN frame.

The GPS receiving unit 20 is a position calculating circuit for calculating the position of the cellular phone 1 according to signals outputted from the GPS antenna 10 as a function block corresponding to a so-called GPS receiver. The GPS receiving unit 20 has an RF (radio frequency) receiving circuit unit 21 and a baseband processing circuit unit 30. The RF receiving circuit unit 21 and the baseband processing unit 30 may be manufactured as separate LSI (large scale integration) units, or as 1 chip unit.

The RF receiving circuit unit 21 is an RF signal processing circuit block which produces oscillation signals to be multiplied by RF signals by dividing or multiplying predetermined oscillation signals. The RF signals outputted from the GPS antenna 10 are multiplied by the produced oscillation signals to be down-converted into intermediate frequency signals (hereinafter referred to as "IF (intermediate frequency) signals"). Then, the IF signals are amplified or processed in other ways, and converted into digital signals by an A/D converter to be outputted to the baseband processing circuit unit 30.

The baseband processing circuit unit 30 is a circuit unit which captures and extracts GPS satellite signals by applying correlation process or the like to the IF signals outputted from the RF receiving circuit unit 21, and decodes data to obtain navigation message, time information and the like. The baseband processing circuit unit 30 has a calculation control unit 31, a ROM 35, and a RAM 37. The calculation control unit 31 has a measurement acquisition calculating unit 33.

The measurement acquisition calculating unit 33 is a circuit unit which captures and tracks GPS satellite signals according to reception signals (IF signals) outputted from the RF receiving circuit unit 21, and has a correlation calculating unit 331. The measurement acquisition calculating unit 33 obtains information such as reception frequencies and code phases of the captured and tracked GPS satellite signals, and outputs the obtained information to the host CPU 40 as measurement actual values.

The correlation calculating unit 331 captures GPS satellite signals by performing correlation calculation for calculating and integrating correlations between PRN codes contained in the reception signals and replica codes using FFT calculation, for example. The replica codes are pseudo signals produced to copy PRN codes contained in GPS satellite signals to be captured.

When GPS satellite signals to be captured are correct signals, the PRN codes and replica codes coincide with each other (capture success). When GPS satellite signals are wrong, the PRN codes and replica codes do not coincide (capture failure). Thus, the peak of the calculated correlation values is detected to determine whether capture has succeeded or not, and correlation calculation between the replica codes sequentially varied and the corresponding reception signals is performed to capture GPS satellite signals.

The correlation calculating unit 331 performs the correlation calculation described above while changing the frequency and phase of the replica code generating signals. When agreements between the frequency of the replica code generating signals and the frequency of the reception signals and between the phase of the PRN codes and the phase of the replica codes are achieved, the correlation value becomes the maximum.

More specifically, the range of predetermined frequency and phase corresponding to capture target GPS satellite signals is set as a search range. Then, correlation calculation in the phase direction for detecting the PRN code starting position (code phase) and correlation calculation in the frequency direction for detecting the frequency are performed in the search range. The search range is defined within a predetermined frequency sweep range around 1.57542 GHz as the carrier wave frequency of the GPS satellite signals for the frequency, and within a code phase range of 1,023 chips as the PRN code chip length for the phase, for example.

The host CPU 40 is a processor for collectively controlling the respective units of the cellular phone 1 under various programs such as a system program stored in the ROM 80. The host CPU 40 measures the position of the cellular phone 1 by the position calculating process and determines the output position to be displayed on the display unit 60. Then, the host CPU 40 produces navigation screen on which the output position is plotted and displays the navigation screen on the display unit 60.

The operation unit 50 is an input device constituted by a touch panel, a button switch and the like to output signals corresponding to pressed keys or buttons to the host CPU 40. Various commands such as input of a destination and a display request of a navigation screen are inputted by operation of the operation unit 50.

The display unit 60 is a display device constituted by LCD (liquid crystal display) and the like to provide various displays corresponding to display signals inputted from the host CPU 40. The display unit 60 displays a navigation screen, time information and others.

The sensor unit 70 has various types of sensors for detecting moving condition of the mobile body, such as the acceleration sensor 71, the gyro sensor 73, and the azimuth sensor 75.

The acceleration sensor 71 is a sensor for detecting orthogonal triaxial acceleration, which may be of either distortion gauge type or piezoelectric type, or an MEMS (micro electro mechanical systems) sensor.

The gyro sensor 73 is a sensor for detecting orthogonal triaxial angular speed, which is disposed in such a position as to have the same axial direction as that of the acceleration sensor 71. The acceleration sensor 71 and the gyro sensor 73 may be combined as one unit sensor.

The azimuth sensor 75 is a biaxial geomagnetic sensor constituted by elements whose resistance values and impedance values increase and decrease according to factors such as magnetic field intensity and other components to detect azimuth of the mobile body.

The ROM 80 is a read-only non-volatile memory unit which stores a system program for controlling the cellular phone 1 using the host CPU 40, and various programs, data and the like for providing a navigation function.

The RAM 90 is a readable and writable volatile memory unit which provides a work area for temporarily storing a system program performed by the host CPU 40, programs for various processes, data being processed in various processes, process results, and others.

The cellular phone antenna 100 is an antenna for transmitting and receiving cellular phone wireless signals to and from wireless base stations provided by a communication service provider of the cellular phone 1.

The cellular phone wireless communication circuit unit 110 is a cellular phone communication circuit unit including RF converting circuit, baseband processing circuit and others to provide telephone communication and mail transmission and reception by modulating and demodulating cellular phone wireless signals.

3. Data Structure

Figure 4:
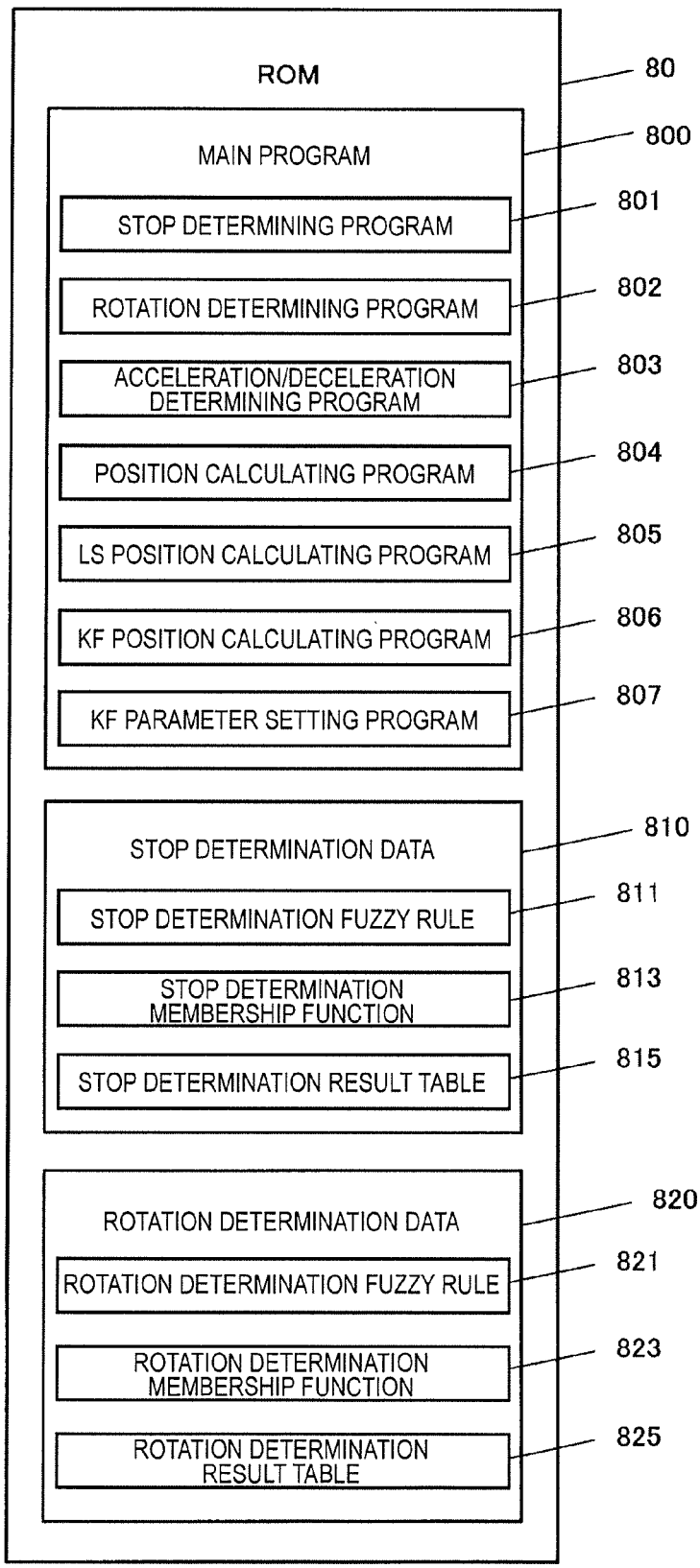
FIG. 4 shows an example of data stored in a ROM.

FIG. 4 shows an example of data stored in the ROM 80. The ROM 80 stores a main program 800 read by the host CPU 40 to be executed in a main process (see FIG. 18), stop determination data 810, and rotation determination data 820.

The main program 800 includes a stop determining program 801 executed in a stop determining process (see FIG. 19), a rotation determining program 802 executed in a rotation determining process (see FIG. 20), an acceleration/deceleration determining program 803 executed in an acceleration/deceleration determining process (see FIG. 21), a position calculating program 804 executed in a position calculating process (see FIG. 22), an LS (least squared) position calculating program 805 executed in an LS position calculating process (see FIG. 23), a KF (Kalman filter) position calculating program 806 executed in a KF position calculating process (see FIG. 24), and a KF parameter setting program 807 executed in a KF parameter setting process (see FIG. 25) as sub routines.

In the main process, the host CPU 40 determines the moving condition of the mobile body by performing the stop determining process, the rotation determining process, and the acceleration/deceleration determining process, and calculates and outputs the position of the mobile body by performing the position calculating process using KF parameter set variably according to the determined moving condition.

In the stop determining process, the host CPU 40 determines whether the mobile body is in the stop condition or not based on the fuzzy inference (fuzzy theory) using the detection result of the acceleration sensor 71. In the rotation determining process, the host CPU 40 determines whether the mobile body is in the rotation condition or not based on the fuzzy inference using the detection result of the gyro sensor 73. In the acceleration/deceleration determining process, the host CPU 40 determines whether the mobile body is in the acceleration/deceleration condition or not using the detection result of the acceleration sensor 71.

In the position calculating process, the host CPU 40 obtains a temporary calculation position by performing the position calculating process (LS position calculating process) based on least squared method, and performs the position calculation process using Kalman filter (KF position calculating process) using the calculation position as a basic value to determine the position to be finally outputted to the display unit 60.

In the position calculating process, the host CPU 40 obtains position vector and moving speed vector of the mobile body in the ECEF (earth centered earth fixed) coordinate system by the LS position calculating process. Then, the host CPU 40 performs predetermined coordinate transformation calculation for the process result in the ECEF coordinate system to calculate the position and moving speed of the mobile body in the ENU (east north up) coordinate system. Then, the host CPU 40 obtains the position of the mobile body in the ENU coordinate system as the output position by executing the KF position calculating process using observation information containing the azimuth detected by the azimuth sensor 75 and the azimuth per time as variances of the azimuth with time.

The ECEF coordinate system is the known earth centered earth fixed coordinate system as a triaxial orthogonal coordinate system having the origin at the center of the earth (center of gravity of the earth), ZE axis corresponding to the earth rotation axis, XE axis corresponding to an axis along which the Greenwich meridian surface and the equatorial surface cross each other, and YE axis corresponding to an axis orthogonal to these two axes. The ENU coordinate system is the known east north up coordinate system as a triaxial orthogonal coordinate system having the origin at a certain point in the vicinity of the ground level, U axis extending to the zenith (upward along the vertical line with respect to the ground level), E axis extending to the east, and N axis extending to the north.

The position, moving speed and azimuth of the mobile body in the ENU coordinate system are calculated by performing known coordinate transformation calculation (matrix calculation) for the position vector and the moving speed vector obtained in the ECEF coordinate system. In this specification, the "moving speed" indicates scalar quantity containing no azimuth (moving direction), and the "moving speed vector" indicates vector quantity containing azimuth.

In the KF parameter setting process, the host CPU 40 sets or changes parameters such as observation error covariance matrix "R" and system noise matrix "Q" used in the KF position calculating process based on the process results of the stop determining process, the rotation determining process, and the acceleration/deceleration determining process. These processes will be described in detail later with reference to a flowchart.

The stop determination data 810 is data used by the host CPU 40 for determining stop in the stop determining process. The stop determination data 810 contains a stop determination fuzzy rule 811, a stop determination membership function 813, and a stop determination result table 815.

FIG. 6 shows an example of data structure of the stop determination fuzzy rule 811. The stop determination fuzzy rule 811 contains rule numbers 8111, a first part 8113 corresponding to "if-clause", and a second part 8115 corresponding to "then-clause" in association with each other.

The first part 8113 defines conditions as three references of "high (possibility of moving)", "middle (uncertain)", or "low (possibility of stopping)" for each of integration values obtained by integrating variations of acceleration (such as variation for each 1 millisecond) for one second (hereinafter, integration value of acceleration in the x axis is "AJx", integration value of acceleration in the y axis is "AJy", and integration value of acceleration in the z axis is "AJz") about each acceleration of the three axes detected by the acceleration sensor 71.

The second part 8115 stores "move" indicating that the mobile body is moving, "uncertain" indicating whether the mobile body is moving or stopping is not determined, and "stop" indicating that the mobile body is stopping in association with the first part 8113.

For example, when all of the "AJx", "AJy" and "AJz" are "middle", it is determined that the mobile body is in "move" according to the corresponding fourth rule. When the "AJx" is "middle" and the "AJy" and "AJz" are "low", it is determined that the mobile body is in "uncertain" according to the corresponding seventh rule. When all of the "AJx", "AJy", and "AJz" are "low", it is determined that the mobile body is in "stop" according to the corresponding eleventh rule.

Figure 7:
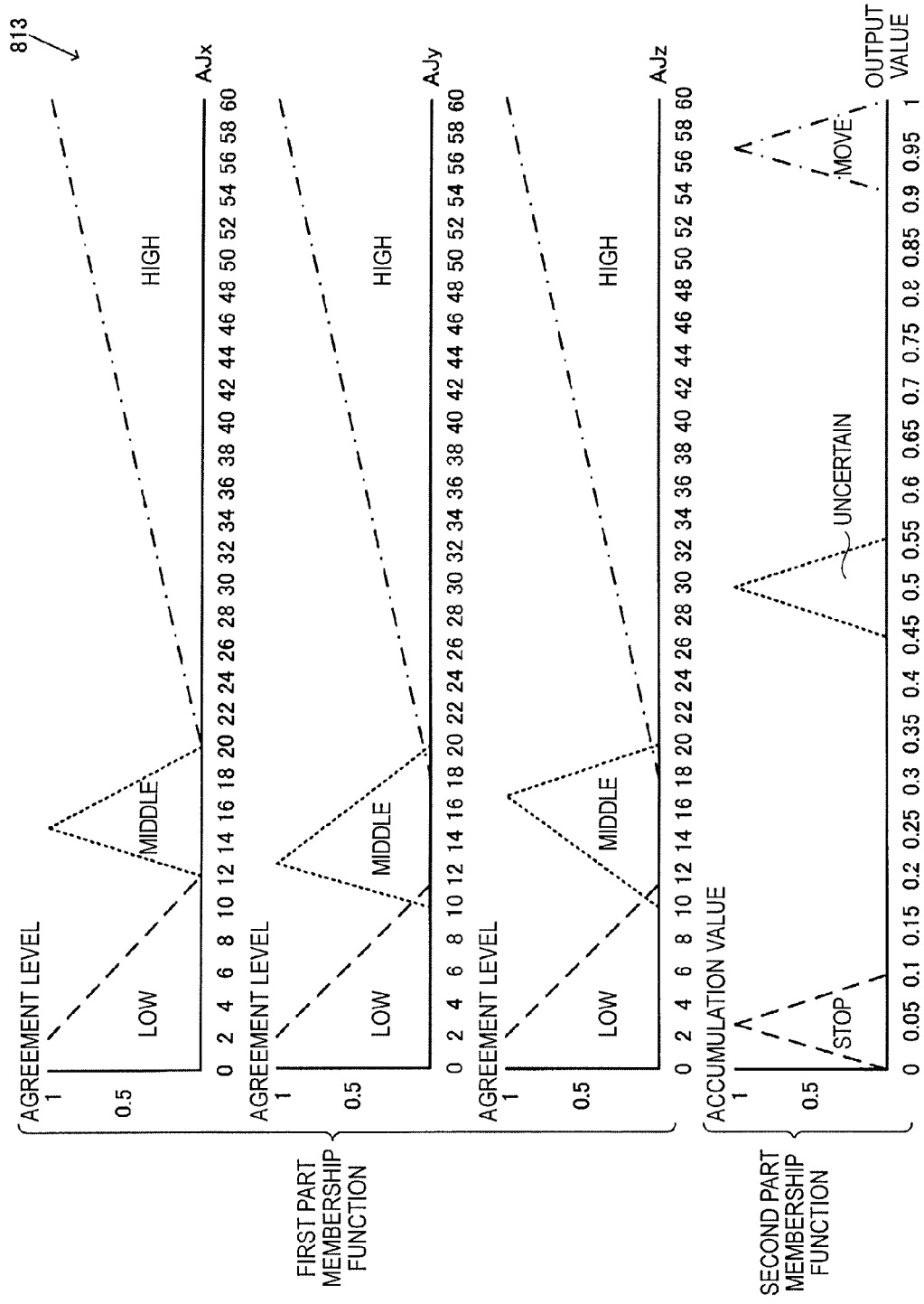
FIG. 7 shows an example of a stop determination membership function.

FIG. 7 shows an example of the stop determination membership function 813. The stop determination membership function 813 contains a membership function corresponding to the first part 8113 of the stop determination fuzzy rule 811, and a membership function corresponding to the second part 8115. The membership function for the first part 8113 has a function for the x axis whose horizontal axis indicates "AJx" and whose vertical axis indicates "agreement level", a function for the y axis whose horizontal axis indicates "AJy" and whose vertical axis indicates "agreement level", and a function for the z axis whose horizontal axis indicates "AJz" and whose vertical axis indicates "agreement level".

Each of the functions has W shape on the whole as a combined shape of three agreement ranges of the detection value agreement range corresponding to "low (possibility of stopping)", the detection value agreement range corresponding to "middle (uncertain)", and the detection value agreement range corresponding to "high (possibility of moving)" of the first part 8113. In each of the functions, the detection value agreement range corresponding to "high (possibility of moving)" is set as the widest range. The agreement levels are expressed as values in the range from "0" to "1". The membership function of the front part 8113 is used for fuzzficating the "AJx", "AJy", and "AJz" as input values.

The membership function of the second part 8115 is a function whose horizontal axis indicates "output" and whose vertical axis indicates "accumulation value". In FIG. 7, the membership function of the second part 8115 is shown as a combination of a triangle corresponding to "stop", a triangle corresponding to "uncertain", and a triangle corresponding to "move" of the second part 8115. The acumulation values are expressed as values in the range from "0" to "1".

For fuzzy inference, defuzzfication method called "gravity method" which determines the final output value by obtaining the center of gravity of the set (fuzzy set) of the conditions defined in the second part 8115 ("stop", "uncertain", and "move") is typically used. In this embodiment, defuzzfication is executed by using the gravity method. The membership function of the second part 8115 is used for defuzzfication.

FIG. 8 shows an example of the table structure of the stop determination result table 815. The stop determination result table 815 stores condition numbers 8151, conditions 8153, and determination results 8155 in association with one another. The conditions 8153 are conditions to be satisfied by the output value obtained by defuzzfication. The determination results 8155 are the final determination results of the moving conditions of the mobile body to store "move" or "stop".

When the output value obtained by defuzzfication is "0.95 or higher", it is determined that the mobile body is in the moving condition. When the output value is "0.05 or lower", it is determined that the mobile body is in the stopping condition.

Figure 11:
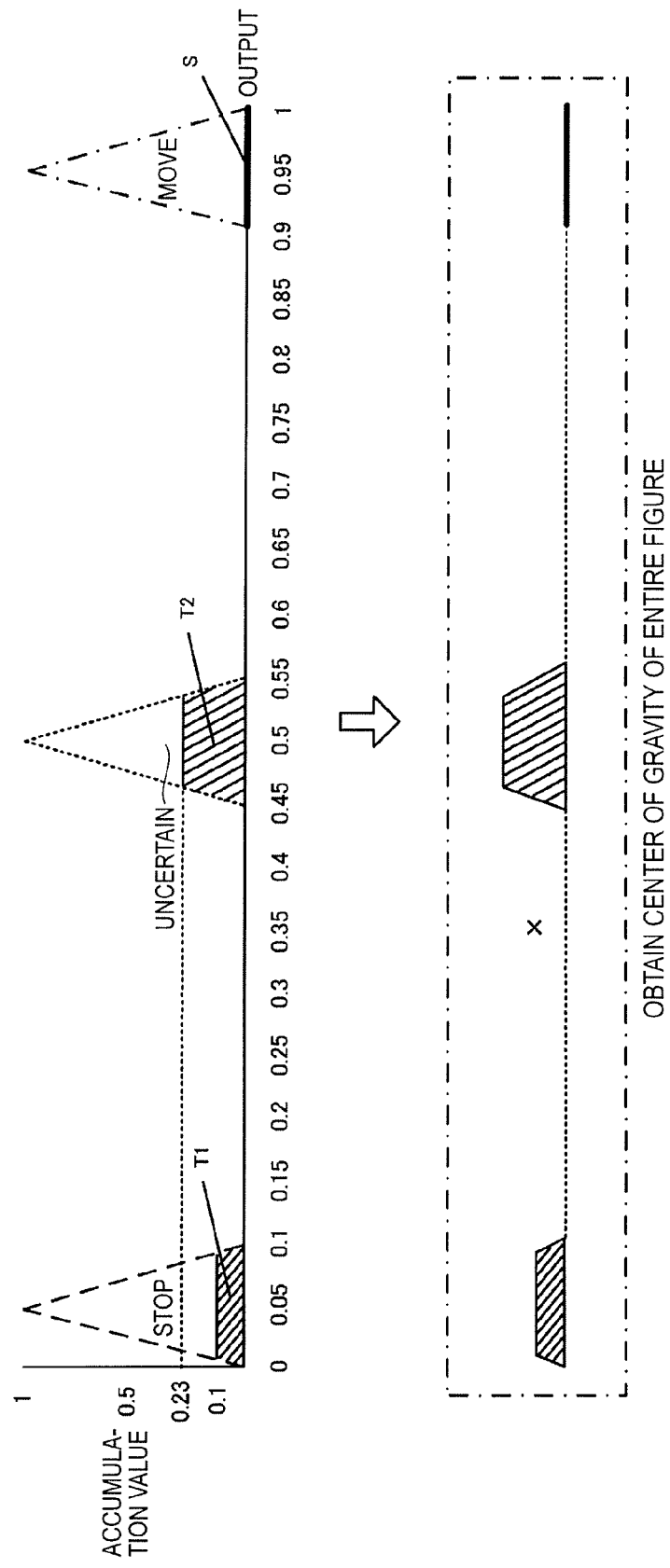
FIG. 11 shows the stop determining process.

A specific example of stop determination based on the fuzzy inference is now explained with reference to FIGS. 9 through 11. In this example, the condition of "AJx=10, AJy=11, AJz=9" is assumed.

Initially, the agreement level for each of the "AJx", "AJy", and "AJz" is determined by using the membership function of the first part 8113. More specifically, it is determined which of the detection value agreement ranges of "low", "middle", and "high" corresponds to each value of "AJx=10, AJy=11, AJz=9".

Figure 9:
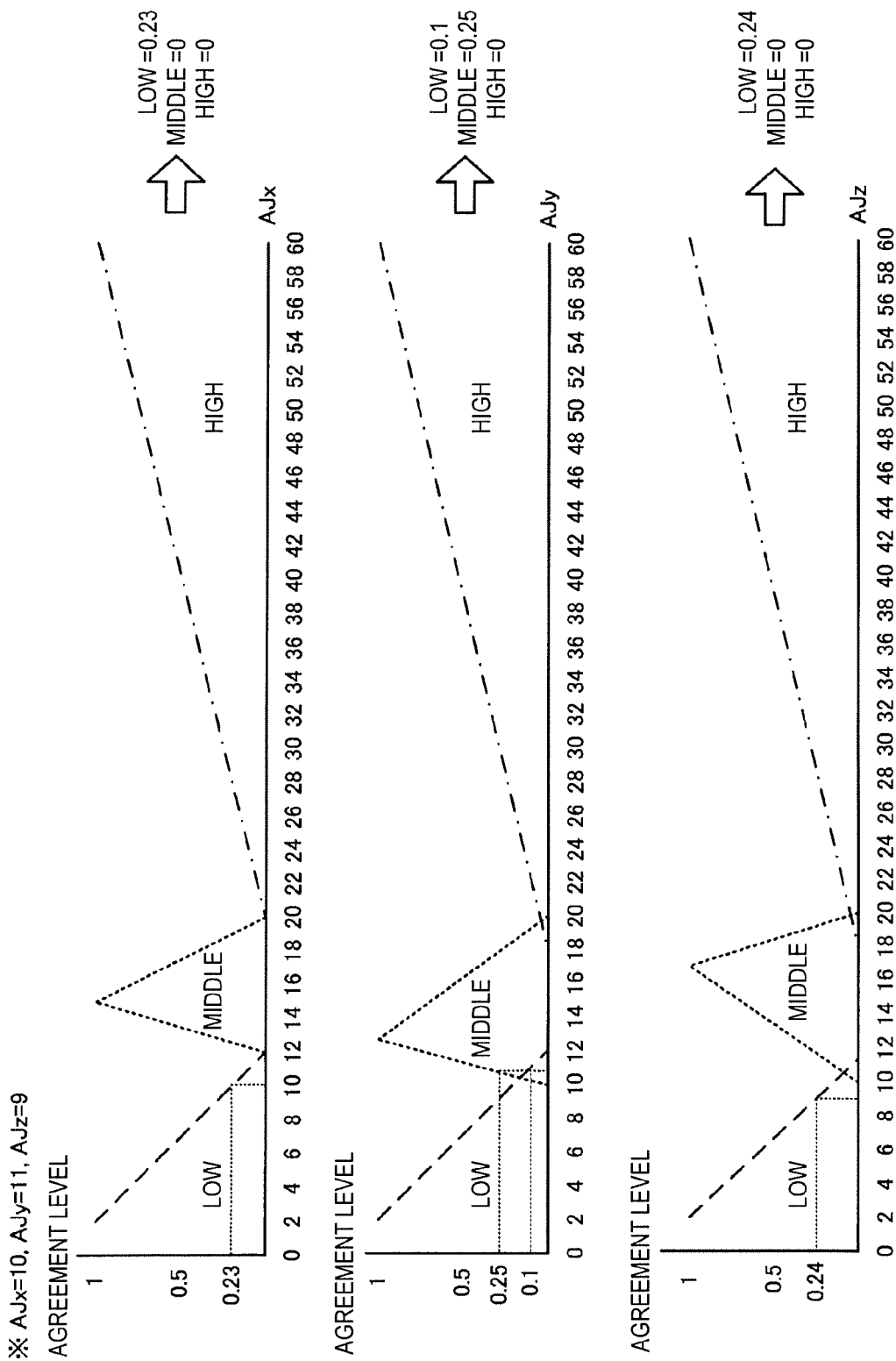
FIG. 9 shows a stop determining process.

According to the example shown in FIG. 9, the value of "AJx" is "0.23" which lies in the detection agreement range of "low" but not in the detection agreement ranges of "middle" and "high". In this case, the agreement level of "AJx" is "low=0.23, middle=0, high=0". Similarly, as for the agreement level determination for "AJy" and "AJz", "AJy" has the agreement level of "low=0.1, middle=0.25, and high=0", and "AJz" has the agreement level of "low=0.24, middle=0, and high=0".

Then, it is determined which rule of the rule numbers 8111 corresponds to the agreement level determined above with reference to the first part 8113 of the stop determination fuzzy rule 811. More specifically, "AJx" has a value in "low, "AJy" has values in "low" and "middle", and "AJz" has a value in "low". Thus, the two rules corresponding to the combinations of "AJx=low, "AJy"=middle, "AJz=low" and "AJx=low, AJy"=low, "AJz"=low" are applied. That is, the ninth and eleventh rules are applicable as shown in FIG. 10.

In this case, the minimum value of the agreement levels of "AJx", "AJy", and "AJz" in the applicable rules is selected as prospective value in the corresponding rules. Thus, the prospective value for the ninth rule is "0.23", and the prospective value for the eleventh rule is "0.1". All of the prospective values for the other rules become "0".

After determining the prospective values, the maximum value of the prospective values is extracted for each of the three conditions of "move", "uncertain", and "stop", and determined as accumulation value for the corresponding condition. As a result, the accumulation value becomes "moving=0, uncertain=0.23, stopping=0.1". Then, the determined accumulation value is defuzzficated to determine the output value. In this embodiment, the output value is determined by the gravity method. The gravity method has known calculation method. In this embodiment, the center of gravity is calculated according to the known calculation method. The concept of the gravity method is now briefly discussed.

Initially, in the membership function of the second part 8115, the triangle of the corresponding condition is cut by the corresponding accumulation value. More specifically, as shown in FIG. 11, the triangle of "stop" is cut along a line of "0.1" as the accumulation value of "stop" along the vertical axis to obtain a trapezoid T1. Similarly, the triangle of "uncertain" is cut along a line of "0.23" as the accumulation value of "uncertain" along the vertical axis to obtain a trapezoid T2. The triangle of "move" is cut along a line "0" as the accumulation value of "move" to obtain a segment S.

Then, the overall center of gravity of one figure combining the trapezoid T1, the trapezoid T2 and the segment S is obtained with the drawing positions of the trapezoid T1, the trapezoid T2 and the segment S unchanged. As a result, the position indicated by mark x is obtained as center of gravity having a value of "0.35" on the horizontal axis. Thus, the output value becomes "0.35".

After the output value is obtained, it is determined which condition of the conditions 8153 corresponds to the output value with reference to the stop determination result table 815 shown in FIG. 8. As a result, the output value corresponds to the third and fourth conditions. When the determination result before the current determination result (last determination result) is the moving condition, the final determination result 8155 becomes "move". When the determination result before current determination result (last determination result) is the stopping condition, the final determination result 8155 becomes "stop".

When it is determined that the mobile body is in the stopping condition based on the stop determining process, the host CPU 40 determines which axes of the three axes "x axis", "y axis", and "z axis" associated with the sensor unit 70 correspond to the gravity axis (Z axis) and the front axis (X axis) by performing the gravity axis determining process and the front axis determining process.

In the gravity axis determining process, the axis having the largest acceleration in the accelerations of the three axes detected by the acceleration sensor 71 is specified. Then, it is determined whether the accelerations of the other two axes are 15% or lower or not of the acceleration of the specified axis. When the accelerations are 15% or lower, the specified axis is determined as the gravity axis (Z axis). When the accelerations are not 15% or lower, determination of the gravity axis cannot be made. In this case, the axis determined as gravity axis by the determination before the current determination (last determination) is determined as gravity axis (Z axis).

In the front axis determining process, the axis having the largest acceleration in the accelerations of the three axes detected by the acceleration sensor 71 when the determination result shifts from the stopping condition to the moving condition is determined as the front axis (X axis). That is, the direction in which the mobile body shifts from the stopping condition to the moving condition is specified as the front axis (X axis).

Returning to the explanation with reference to FIG. 4, the rotation determination data 820 is data used by the host CPU 40 for rotation determination in the rotation determining process. The rotation determination data 820 contains a rotation determination fuzzy rule 821, a rotation determination membership function 823, and a rotation determination result table 825.

Figure 12:
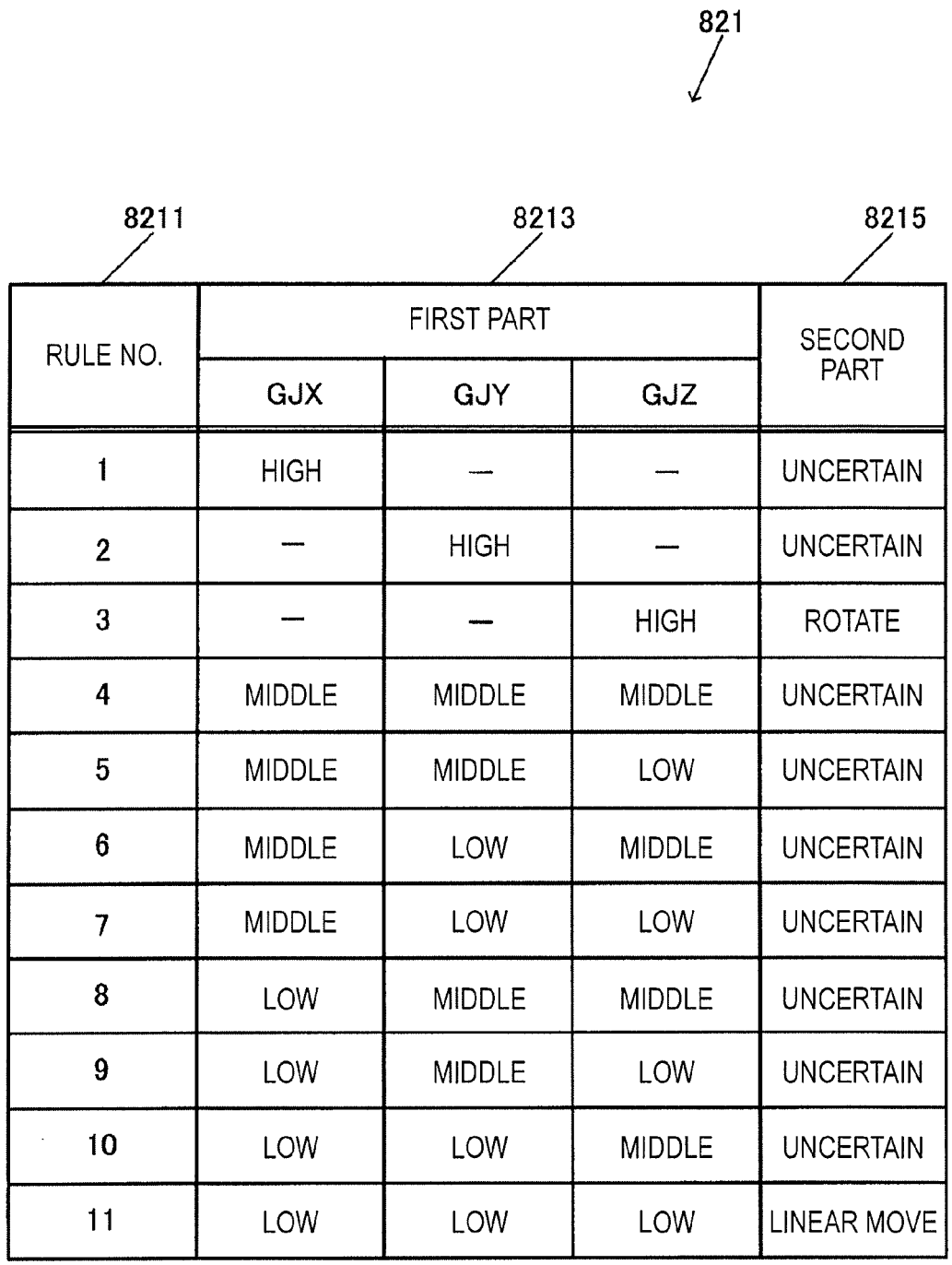
FIG. 12 shows an example of data structure of rotation determination fuzzy rule.

FIG. 12 shows an example of data structure of the rotation determination fuzzy rule 821. The rotation determination fuzzy rule 821 contains rule numbers 8211, a first part 8213 corresponding to the respective rules, and a second part 8215 corresponding to the respective rules. The first part 8213 and the second part 8215 are stored in association with each other.

The first part 8213 stores conditions of three references constituted by "high (possibility of rotating)", "middle (uncertain)", or "low (possibility of linearly moving)" for each of the absolute values of the angular speeds corresponding to the front axis (X axis), the gravity axis (Z axis), and the axis orthogonal to the X axis and Z axis (Y axis) in the angular speeds of the three axes detected by the gyro sensor 73 (hereinafter, absolute value of angular speed in the X axis is "GJX", absolute value of angular speed in the Y axis is "GJY", and absolute value of angular speed in the Z axis is "GJZ").

The second part 8215 stores "rotate" indicating that the mobile body is rotating, "uncertain" indicating whether the mobile body is rotating or linearly moving is not determined, and "linear move" indicating that the mobile body is linearly moving in association with first part 8213.

For example, when "GJZ" is "high", the first rule is applicable. Thus, the condition is determined as "rotate" regardless of the value of "GJX" and "GJY". When "GJX" is "low" and "GJY" and "GJZ" are "middle", the eighth rule is applicable. Thus, the condition is determined as "uncertain". When all of "GJX", "GJY", and "GJZ" are "low", the eleventh rule is applicable. Thus, the condition is determined as "linear move".

Figure 13:
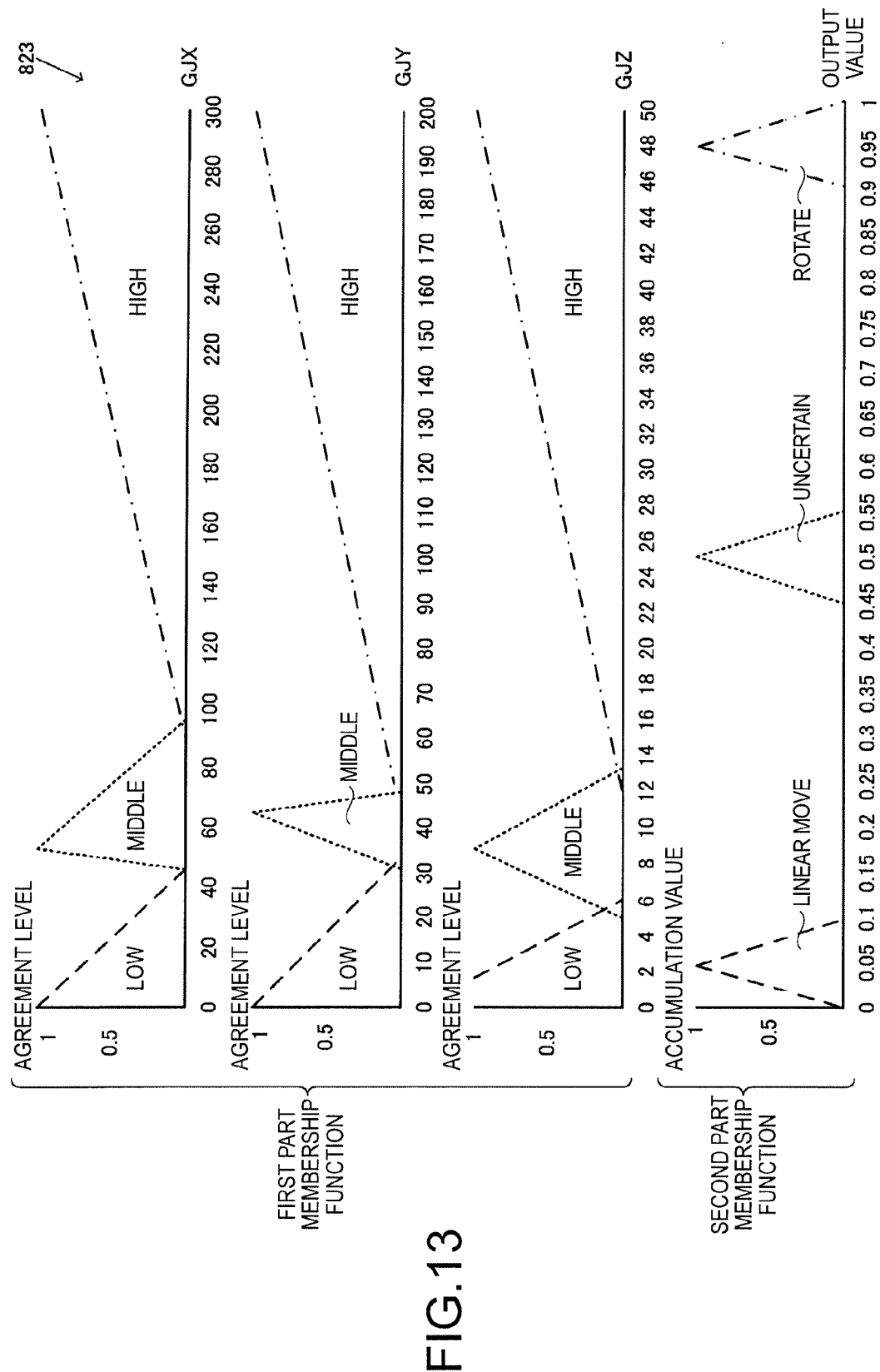
FIG. 13 shows an example of a rotation determination membership function.

FIG. 13 shows an example of the rotation determination membership function 823. The rotation determination membership function 823 contains a membership function corresponding to the first part 8213 of the rotation determination fuzzy rule 821, and a membership function corresponding to the second part 8215. The membership function for the first part 8213 has a function for the X axis whose horizontal axis indicates "GJX" and whose vertical axis indicates "agreement level", a function for the Y axis whose horizontal axis indicates "GJY" and whose vertical axis indicates "agreement level", and a function for the Z axis whose horizontal axis indicates "GJZ" and whose vertical axis indicates "agreement level".

Each of the functions has W shape on the whole as a combined shape of three agreement ranges of the detection value agreement range corresponding to "low (possibility of linearly moving)", the detection value agreement range corresponding to "middle (uncertain)", and the detection value agreement range corresponding to "high (possibility of rotating)" of the first part 8213. In each of the functions, the detection value agreement range corresponding to "high (possibility of rotating)" is set as the widest range. The agreement levels are expressed as values in the range from "0" to "1".

One characteristic point is that the respective scales of the horizontal axes of the membership function axes shown in FIG. 13 are different. The Z axis is the gravity axis (yaw axis), and thus the mobile body rotates around the Z axis in most cases. Thus, for the angular speed around the Z axis, which of the groups "low", "middle", and "high" corresponds to the angular speed around the Z axis needs to be accurately determined. However, for the angular speed around the X axis and the Y axis around which the mobile body scarcely rotates, only rough determination is needed. Thus, the horizontal axis of the Z axis has a narrower scale than those of the other two axes, and the agreement range of the Z axis for "high (possibility of rotating)" is set as a wider range than those of the membership functions of the other two axes.

For example, when the angular speeds around the X axis, Y axis, and Z axis have the same value of "20", this value corresponds to "low" group for the X axis and Y axis but corresponds to "high" group for the Z axis according to the membership function in FIG. 13.

On the other hand, the stop determining process described above is a process for specifying the gravity axis and the front axis. Since this process is performed under the condition of unclear correspondences between the three axes (x axis, y axis, and z axis) associated with the sensor unit 70 and the gravity axis (Z axis) and the front axis (X axis), the agreement ranges are substantially equivalent for the respective axes as shown in FIG. 7.

The membership function of the second part 8125 is a function whose horizontal axis indicates "output" and whose vertical axis indicates "accumulation value". This membership function is expressed as a triangle corresponding to "linear move", a triangle corresponding to "uncertain", and a triangle corresponding to "rotate" as independent three triangles of the second part 8215 as shown in FIG. 13. The accumulation values are defined as values in the range from "0" to "1".

FIG. 14 shows an example of the data structure of the rotation determination result table 825. The rotation determination result table 825 stores condition numbers 8251, conditions 8253, and determination results 8255 in association with one another. The conditions 8253 are conditions to be satisfied by the output value obtained by defuzzfication. The determination results 8255 are the final determination results of the rotating conditions of the mobile body to store "rotate", "linear move" or "uncertain (the same determination result as the determination result before the current determination result (last determination result)".

When the output value obtained by defuzzfication is "0.95 or higher", for example, it is determined that the mobile body is in the "rotating" condition. When the output value is "0.05 or lower", it is determined that the mobile body is in the "linearly moving" condition. In other cases, it is determined that the mobile body is in the "uncertain" condition. In this case, the same determination result as the last determination result is employed.

The output determining method in the rotation determining process is similar to the stop determining process described above. That is, the input values "GJX", "GJY", and "GJZ" are fuzzficated by using the membership function of the first part 8213. Then, each accumulation value for "GJX", "GJY", and "GJZ" is calculated according to the agreement level obtained by fuzzfication and the rotation determination fuzzy rule 821. Subsequently, the calculated accumulation value is defuzzficated by using the membership function of the second part 8215 to determine which condition 8253 in the rotation determination result table 825 corresponds to the output value expressed by the obtained center of gravity.

Figure 5:
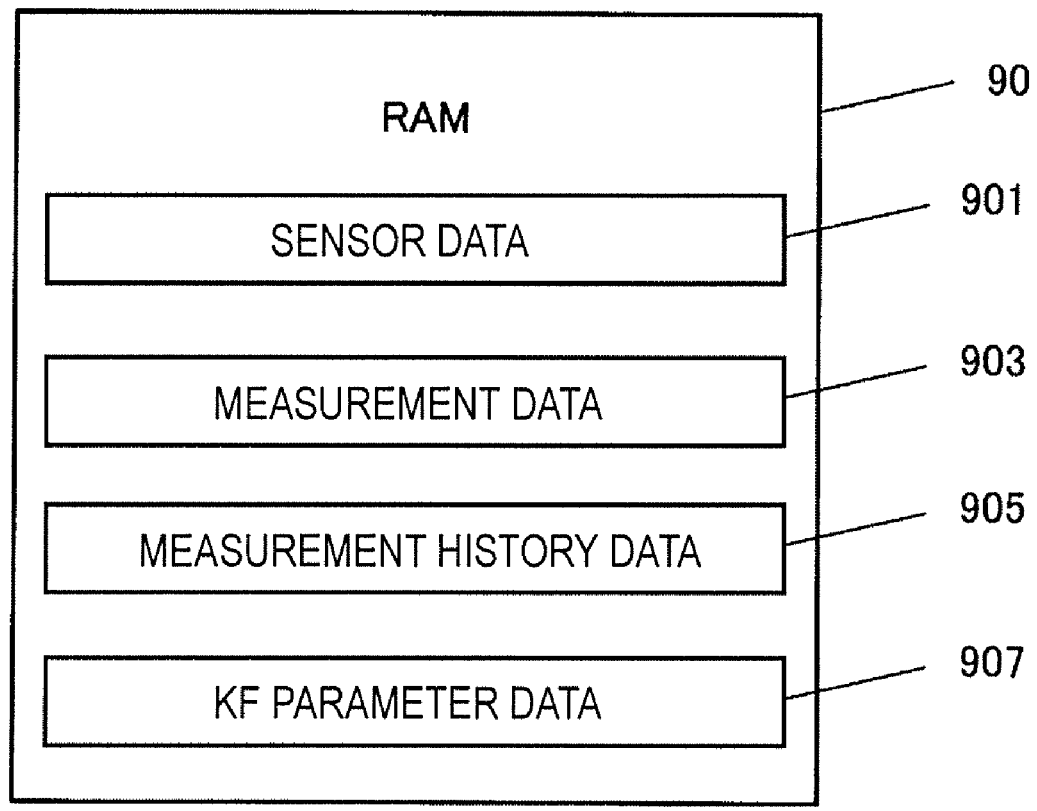
FIG. 5 shows an example of data stored in a RAM.

FIG. 5 shows an example of the data stored in the RAM 90. The RAM 90 stores sensor data 901, measurement data 903, measurement history data 905, and KF parameter data 907.

FIG. 15 shows an example of data structure of the sensor data 901. The sensor data 901 stores three-dimensional accelerations 9013 detected by the acceleration sensor 71 in association with detection times 9011 (by millisecond, for example), three-dimensional angular speeds 9015 detected by the gyro sensor 73, and azimuths 9017 detected by the azimuth sensor 75 in association with one another. The azimuths 9017 are expressed as azimuth angles on the two-dimensional plane.

For example, the acceleration 9013 detected at the detection time "t1" is "(Ax1, Ay1, Az1)". The angular speed 9015 is "(ωx1, ωy1, ωz1)". The azimuth is "Heading1".

FIG. 16 shows an example of the data structure of the measurement data 903. The measurement data 903 is data about the measurement actual values obtained and calculated by the measurement acquisition calculating unit 33. The measurement data 903 stores capture satellites 9031 and measurement actual values 9033 constituted by reception frequencies and code phases of GPS satellite signals received from the capture satellites with correspondence between the capture satellites 9031 and the measurement actual values 9033. For example, the measurement actual value 9033 for a capture satellite "S1" has a reception frequency "Freq1" and a code phase "CP1".

FIG. 17 shows an example of the data structure of the measurement history data 905. The measurement history data 905 is data about the position and moving speed of the mobile body in the ENU coordinate system. The measurement history data 905 stores east positions 9052, north positions 9053, east moving speeds 9054, north moving speeds 9055, and moving speeds on the position calculation plane 9056 at respective calculation times 9051 in association with one another.

The east positions 9052 are position coordinates in the east-west direction in the ENU coordinate system. The north positions 9053 are position coordinates in the south-north direction in the ENU coordinate system. The east moving speeds 9054 are moving speeds in the east-west direction in the ENU coordinate system. The north moving speeds 9055 are moving speeds in the south-north direction in the ENU coordinate system.

The moving speeds 9056 on the position calculation plane are moving speeds on the two-dimensional plane (defined as "position calculation plane") in the east, west, south, and north directions with the position coordinate in the zenith direction in the ENU coordinate system set at "0", for example. The moving speeds 9056 on the position calculation plane can be calculated by combining the east moving speeds 9054 and the north moving speeds 9055.

For example, an east position "EastPos1", a north position "NorthPos1", an east moving speed "Eastvel1", a north moving speed "NorthVel1", and a moving speed on the position calculation plane "speed1" are stored at a position calculation time "T1".

The KF parameter data 907 is data storing various parameters of Kalman filter used for the KF position calculating process and updated by the host CPU 40 in the position calculating process.

4. Flow of Process

Figure 18:
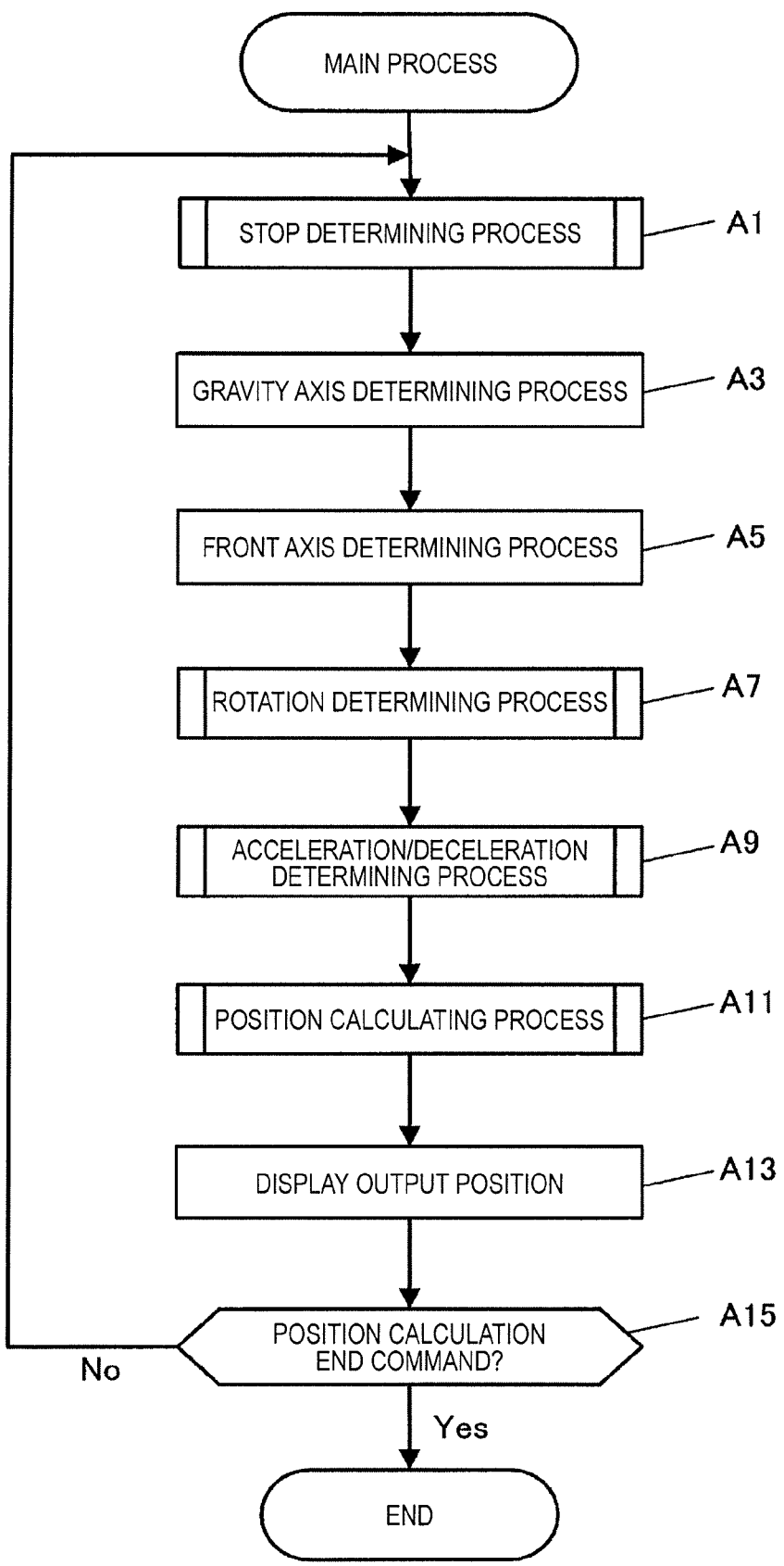
FIG. 18 is a flowchart showing flow of a main process.

FIG. 18 is a flowchart showing the flow of the main process performed by the cellular phone 1 under the main program 800 stored in the ROM 80 and read and executed by the host CPU 40. The main process is a process initiated when the host CPU 40 detects input of position calculation starting command to the operation unit 50 as a process performed in synchronization with various processes such as execution of various applications.

In the following explanation, it is assumed that the position calculation is performed for every one second. That is, each time interval between the position calculation times is set at 1 second. The term "current" indicates the position calculation time at which the calculation is currently performed. The term "the calculation before the current calculation (last calculation)" indicates the position calculation time at which the last calculation is performed. The term "the calculation before the last calculation" indicates the position calculation time at which the calculation before the last calculation is performed.

It is possible to interlock the power source ON/OFF of the cellular phone 1 with start/stop of the GPS such that execution of the process can be initiated when power supply of the cellular phone 1 is detected. Though not particularly described, reception of the RF signals by the GPS antenna 10, down-convert into IF signals by the RF receiving circuit unit 21, acquisition and calculation of information about reception frequencies and code phases (measurement actual values) of GPS satellite signals by the measurement acquisition calculating unit 33, and other processes are performed as necessary during execution of the main process. The host CPU 40 obtains detection results from the sensor unit 70 for every 1 millisecond, and accumulates and stores the detection results in the sensor data 901 of the RAM 90.

Initially, the host CPU 40 reads and executes the stop determining program 801 stored in the ROM 80 to perform the stop determining process (step A1).

Figure 19:
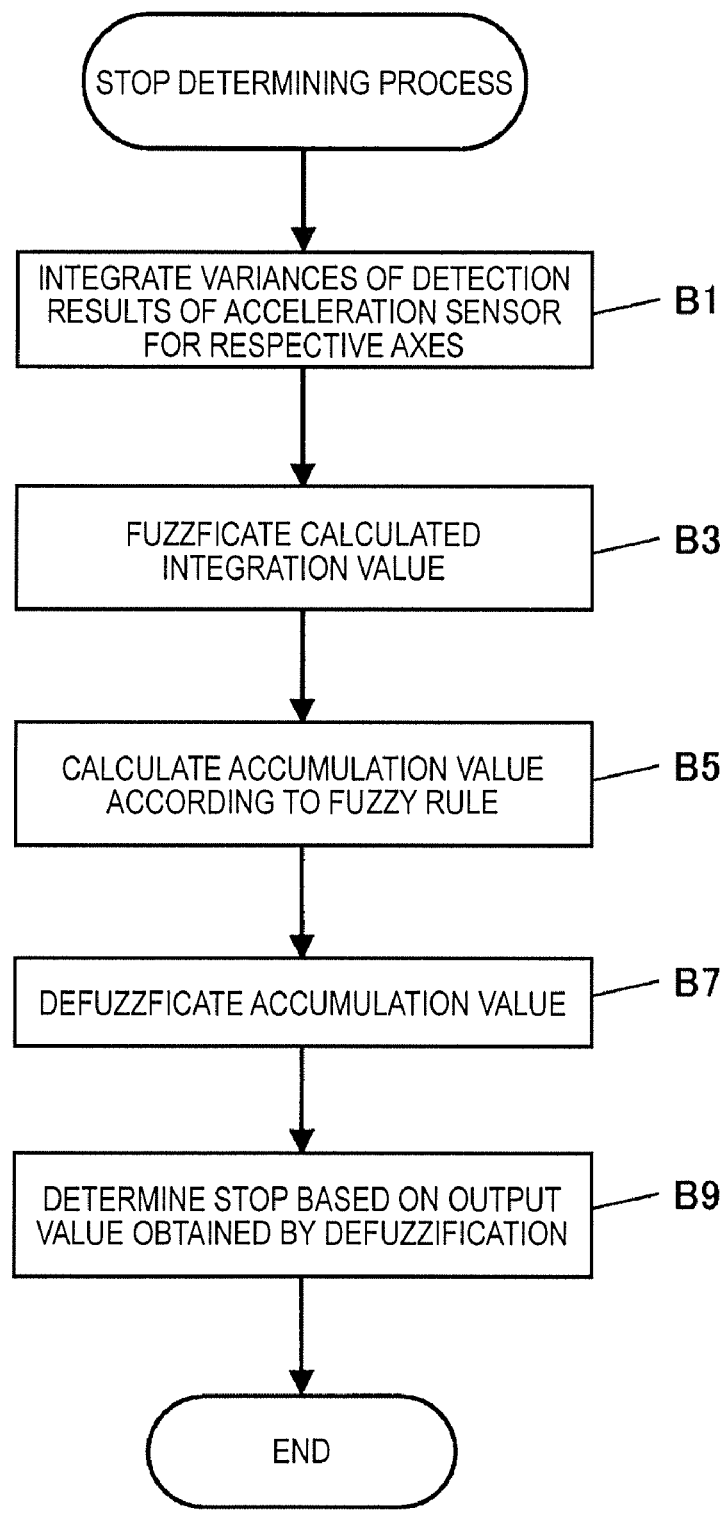
FIG. 19 is a flowchart showing flow of a stop determining process.

FIG. 19 is a flowchart showing the flow of the stop determining process.

The host CPU 40 integrates variations of the detection results of the acceleration sensor 71 for 1 second for the respective axes (step B1). Then, the host CPU 40 fuzzficates the integration value calculated in step B1 by using the membership function of the first part 8113 contained in the stop determination membership function 813 of the ROM 80 (step B3). Then, the host CPU 40 obtains the accumulation value according to the stop determination fuzzy rule 811 (step B5).

The host CPU 40 defuzzficates the accumulation value obtained in step B5 by using the membership function of the second part 8115 contained in the stop determination membership function 813 (step B7). Then, the host CPU 40 determines stopping condition based on the output value obtained by defuzzfication according to the stop determination result table 815 (step B9). Subsequently, the host CPU 40 finishes the stop determining process.

Returning to the main process shown in FIG. 18, the host CPU 40 performs the gravity axis determining process after the stop determining process (step A3). More specifically, when determining stopping condition in the stop determining process, the host CPU 40 specifies the axis having the largest acceleration in the accelerations of the three axes detected by the acceleration sensor 71. Then, the host CPU 40 determines whether the accelerations of the other two axes are 15% or lower of the acceleration of the specified axis or not. When the accelerations are 15% or lower, the specified axis is determined as the gravity axis (Z axis). When the accelerations are not 15% or lower, the axis determined as gravity axis by the determination before the current determination (last determination) is determined as the gravity axis (Z axis).

Then, the host CPU 40 performs the front axis determining process (step A5). More specifically, when the moving condition is determined by the current determination under the condition that the stopping condition has been determined by the determination before the current determination (last determination), the axis having the largest acceleration in the accelerations of the three axes detected by the acceleration sensor 71 is determined as the front axis (X axis). That is, the direction in which the mobile body advances by one step from the stopping condition is specified and determined as the front axis (X axis).

Then, the host CPU 40 reads and executes the rotation determining program 802 stored in the ROM 80 to perform the rotation determining process (step A7).

Figure 20:
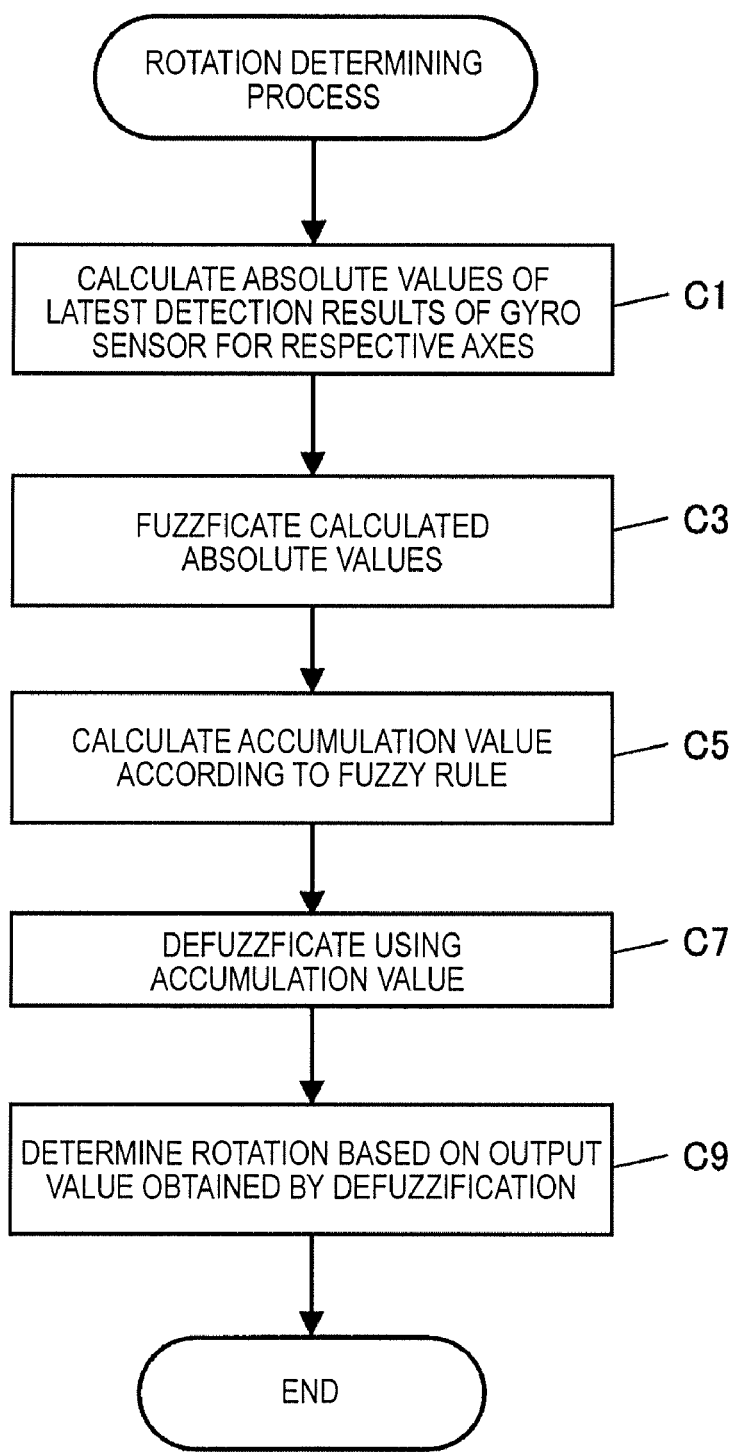
FIG. 20 is a flowchart showing flow of a rotation determining process.

FIG. 20 is a flowchart showing the flow of the rotation determining process.

Initially, the host CPU 40 calculates each absolute value of the latest detection results (angular speeds) obtained by the gyro sensor 73 for the "X axis", "Y axis", and "Z axis" (step C1). Then, the host CPU 40 fuzzficates the absolute values of the angular speeds calculated in step C1 by using the membership function of the first part 8213 contained in the rotation determination membership function 823 of the ROM 80 (step C3). After fuzzfication, the host CPU 40 obtains the accumulation value according to the rotation determination fuzzy rule 821 (step C5).

Then, the host CPU 40 defuzzficates the accumulation value obtained in step C5 by using the membership function of the second part 8215 contained in the rotation determination membership function 823 (step C7). After defuzzfication, the host CPU 40 determines whether the mobile body is in the rotating condition or not based on the output value obtained in the defuzzfication according to the rotation determination result table 825 (step C9). Then, the host CPU 40 ends the rotation determining process.

Returning to the main process shown in FIG. 18, the host CPU 40 having finished the rotation determining process reads and executes the acceleration/deceleration determining program 803 stored in the ROM 80 to perform the acceleration/deceleration determining process (step A9).

Figure 21:
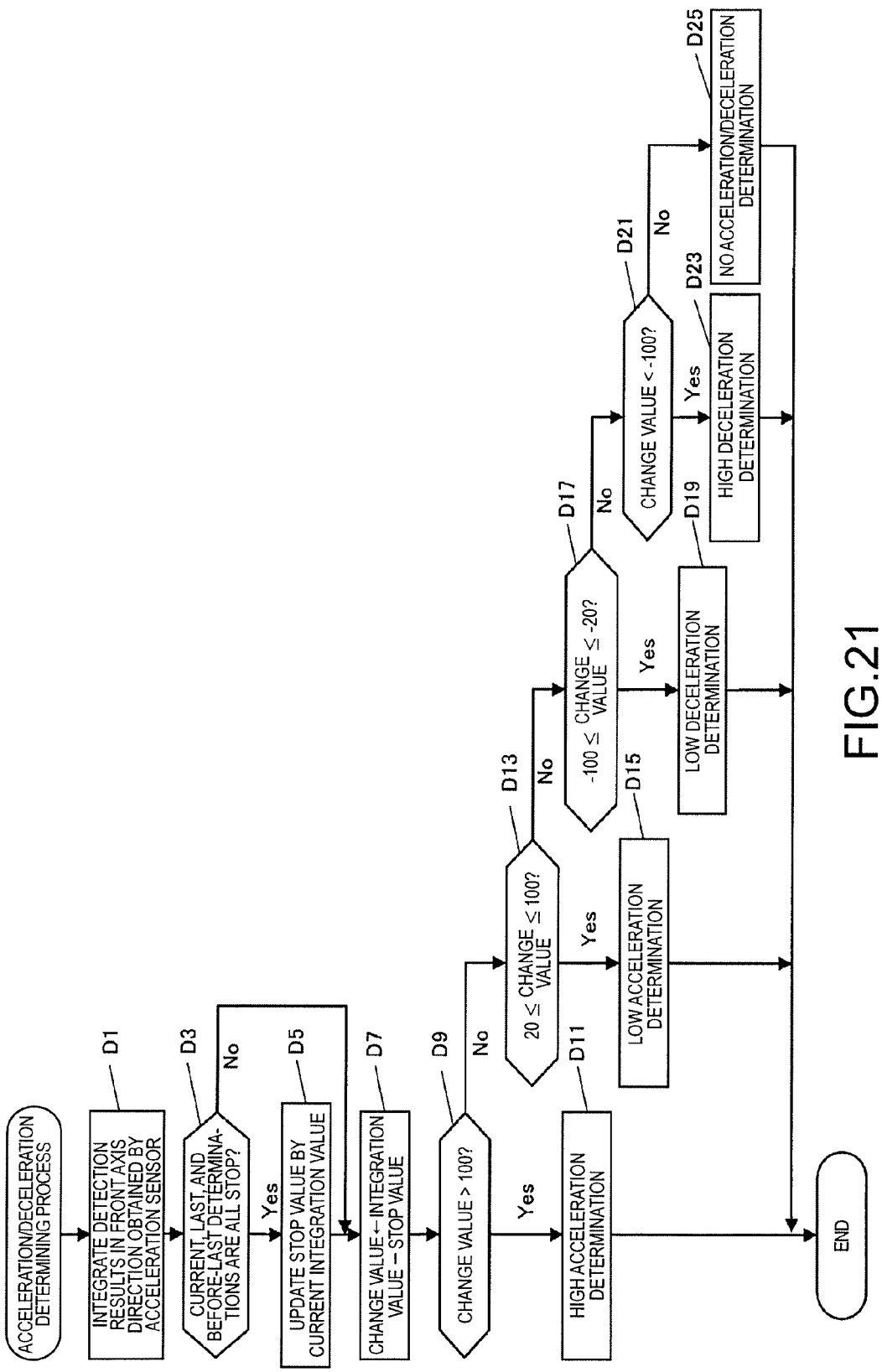
FIG. 21 is a flowchart showing flow of an acceleration/deceleration determining process.

FIG. 21 is a flowchart showing the flow of the acceleration/deceleration process.

Initially, the host CPU 40 integrates the detection results in the front axis (X axis) direction obtained by the acceleration sensor 71 for one second (step D1). Then, the host CPU 40 determines whether all of the determination results by the current determination, the determination before the current determination (last determination), and the determination before the last determination in the stop determining process are the stopping condition (step D3).

When it is determined that all of the determination results are the stopping condition (step D3; YES), the host CPU 40 updates the stop value by the integration value calculated in step D1 (step D5). When it is determined that the mobile body is in the moving condition by either the determination before the current determination (last determination) or the determination before the last determination (step D3; NO), the host CPU 40 shifts the flow of the process to step D7 without updating the stop value.

Then, the host CPU 40 subtracts the stop value currently set from the integration value calculated in step D1 to obtain a change value (step D7). Subsequently, the host CPU 40 determines whether the change value exceeds "100" or not (step D9). When determination that the change value exceeds "100" (step D9; YES) is made, it is determined that the mobile body is in the "high acceleration condition" (step D11). Then, the acceleration/deceleration determining process ends.

When the change value is determined as "100 or lower" in step D9 (step D9; NO), it is determined whether the change value is in the range "from 20 to 100" or not (step D13). When determination that the change value is in the range "from 20 to 100" is made (step D13; YES), it is determined that the mobile body is in the "low acceleration condition" (step D15). Then, the acceleration/deceleration determining process ends.

When determination that the change value is not in the range "from 20 to 100" is made (step D13; NO), the host CPU 40 determines whether the variable value is in the range "from −100 to −20" or not (step D17). When determination that the change value is in the range "from −100 to −20" is made (step D17; YES), it is determined that the mobile body is in the "low deceleration condition" (step D19). Then, the acceleration/deceleration determining process ends.

When determination that the variable value is not in the range from "−100 to −20" is made (step D17; NO), the host CPU 40 determines whether the change value is lower than "−100" or not (step D21). When determination that the variable value is lower than −100 is made (step D21; YES), it is determined that the mobile body is in the "high deceleration condition" (step D23). Then, the acceleration/deceleration determining process ends.

When determination that the variable value is "−100" or more is made in step D21 (step D21; NO), the host CPU 40 determines that the mobile body is in "no acceleration/deceleration condition" (step D25). Then, the acceleration/deceleration determining step ends.

Returning to the main process in FIG. 18, the host CPU 40 reads and executes the position calculating program 804 stored in the ROM 80 to perform the position calculating process (step A11).

Figure 22:
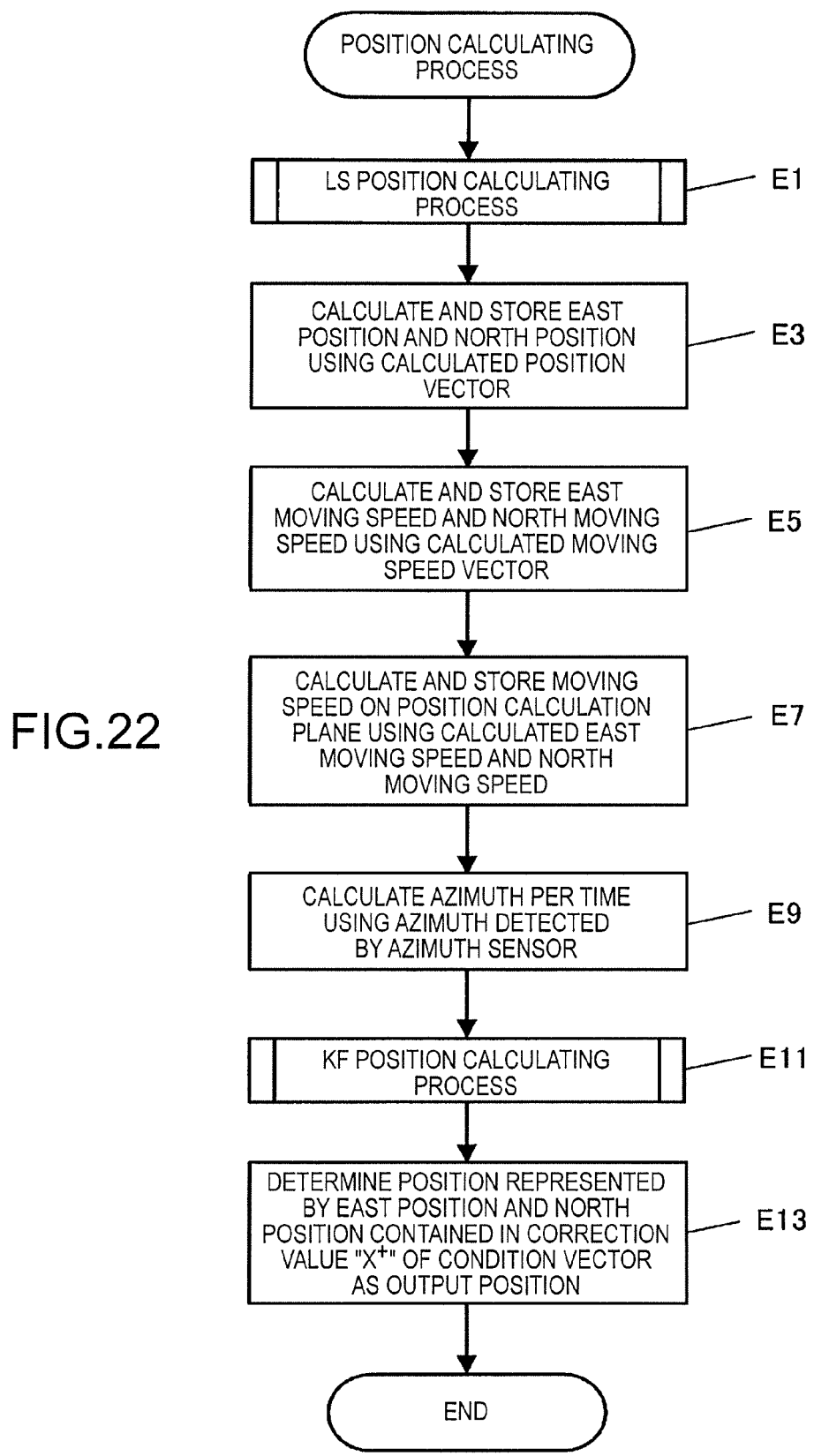
FIG. 22 is a flowchart showing flow of a position calculating process.

FIG. 22 is a flowchart showing the flow of the position calculating process.

Initially, the host CPU 40 reads and executes the LS position calculating program 805 stored in the ROM 80 to perform the LS position calculating process (step E1).

Figure 23:
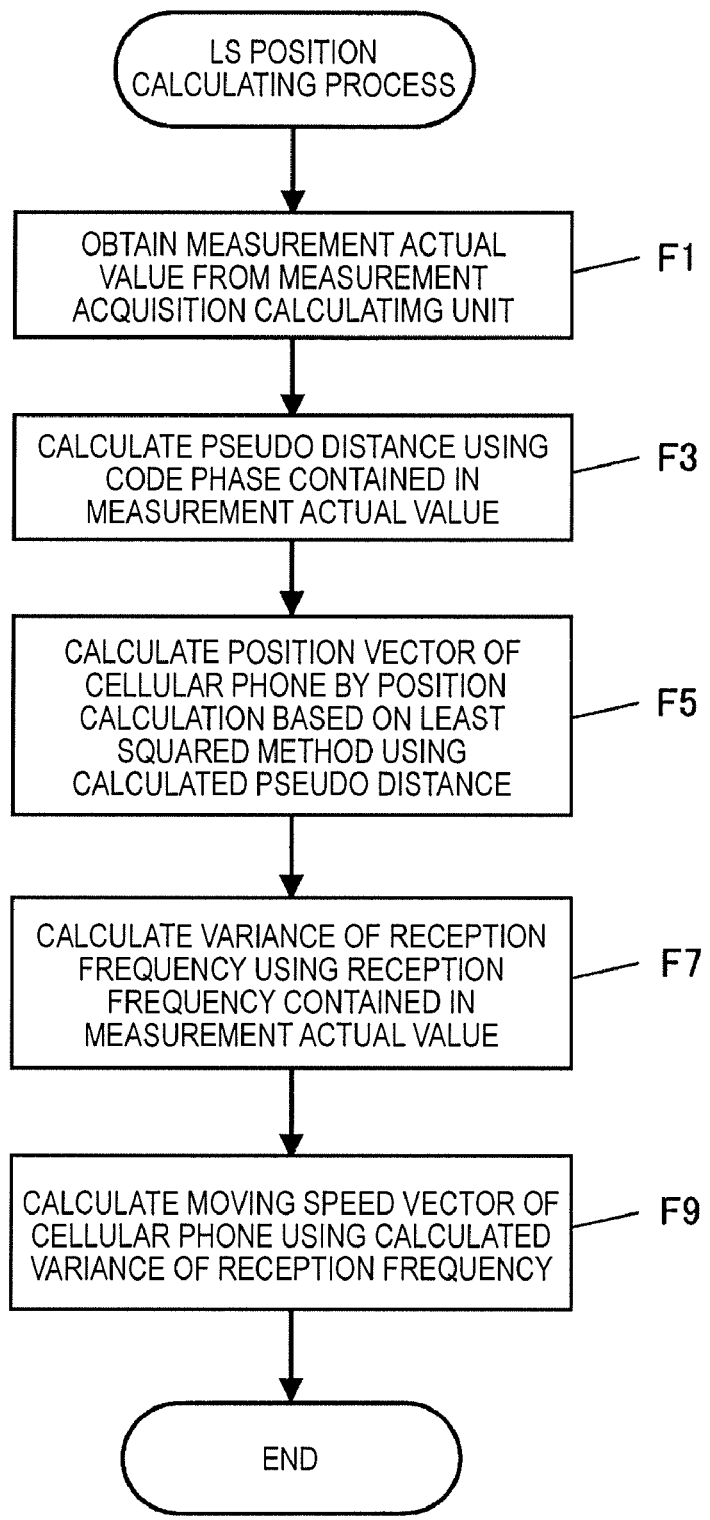
FIG. 23 is a flowchart showing flow of an LS position calculating process.

FIG. 23 is a flowchart showing the flow of the LS position calculating process.

Initially, the host CPU 40 obtains the measurement actual value from the measurement acquisition calculating unit (step F1), and calculates a pseudo distance between the cellular phone 1 and the capture satellite using the code phase contained in the obtained measurement actual value (step F3). Then, the host CPU 40 performs the position calculation by using the least squared method based on the calculated pseudo distance to calculate the position vector of the mobile body in the ECEF coordinate system (step F5).

Then, the host CPU 40 calculates the variance of the reception frequency for one second by using the reception frequency of the GPS satellite contained in the measurement actual value obtained in step F1 (step F7). Then, the host CPU 40 calculates the moving speed vector of the mobile body in the ECEF coordinate system by using the variance of the calculated reception frequency (step F9), and ends the LS position calculating process.

Returning to the position calculating process shown in FIG. 22, the host CPU 40 having finished the LS position calculating process performs predetermined coordinate transformation calculation for the position vector in the ECEF coordinate system calculated in step F5 to calculate the east position "EastPos" and the north position "NorthPos" in the ENU coordinate system, and stores these positions in the measurement history data 905 of the RAM 90 in association with the current position calculation time (step E3).

Similarly, the host CPU 40 performs predetermined coordinate transformation calculation for the moving speed vector in the ECEF coordinate system calculated in step F9 to calculate the east moving speed "EastVel" and the north moving speed "NorthVel" in the ENU coordinate system, and stores these moving speeds in the measurement history data 905 of the RAM 90 in association with the current position calculation time (step E5).

Then, the host CPU 40 calculates the moving speed "Speed" of the mobile body on the position calculation plane by using the east moving speed "EastVel" and the north moving speed "NorhVel" calculated in step E5 according to the following equation (1), and stores the moving speed "Speed" in the measurement history data 905 of the RAM 90 in association with the current position calculation time (step E7).

$$\text{Speed} = \sqrt{(\text{EastVel})^2 + (\text{NorthVel})^2} \quad (1)$$

Then, the host CPU 40 calculates the azimuth per time according to the following equation (2) based on the azimuth stored in the sensor data 901 (step E9).

$$dHeading = \frac{\text{Heading}(t) - \text{Heading}(t-1)}{dt} \quad (2)$$

In this equation, "t" indicates the position calculation time, and "dt" indicates the time difference between the current position calculation time and the position calculation time before the current position calculation time (last position calculation time).

Then, the host CPU 40 reads and executes the KF position calculating program 806 stored in the ROM 80 to perform the KF position calculating process (step E11).

Figure 24:
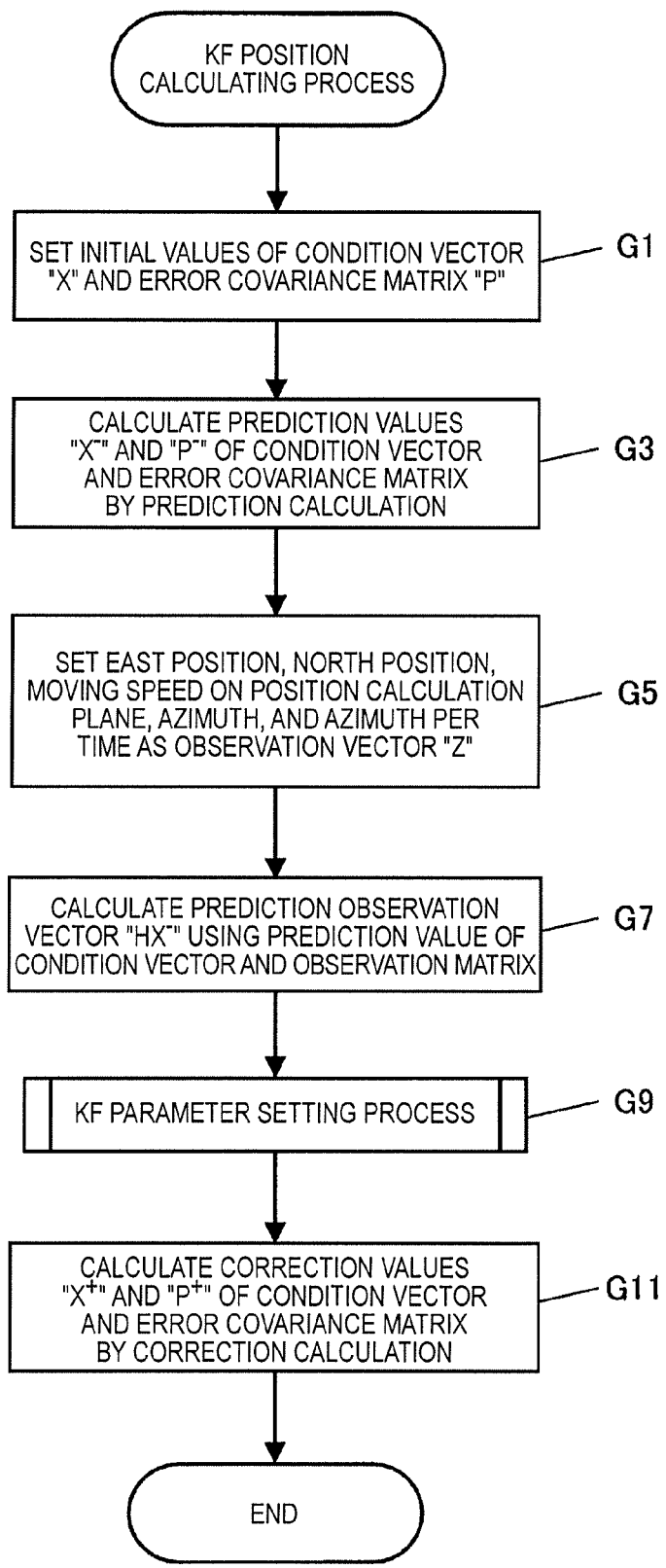
FIG. 24 is a flowchart showing flow of a KF position calculating process.

FIG. 24 is a flowchart showing the flow of the KF position calculating process.

Initially, KF initial values of a condition vector "X" and an error covariance matrix "P" for the KF position calculation process are set (step G1). In the KF position calculating process, prediction calculation and correction calculation are performed by using the condition vector "X" expressed by 5×1 matrix shown in the following equation (3) containing components of the east position "EastPos", the north position "NorthPos", the moving speed "Speed" on the position calculation plane, the azimuth "Heading", and the azimuth per time "dHeading". The characteristic point is that the accuracy in the azimuth calculation is increased by providing the azimuth per time contained in the condition vector.

$$X = \begin{pmatrix} EastPos \\ NorthPos \\ Speed \\ Heading \\ dHeading \end{pmatrix} \quad (3)$$

The error covariance matrix "P" is 5×5 matrix showing error covariance of the respective five-dimensional components of the condition vector "X". The initial values of the condition vector "X" and the error covariance matrix "P" are correction values "X⁺" and "P⁺" of the condition vector "X and the error covariance matrix "P" obtained in the KF position calculating process performed at the time before the current time (last time), for example.

Then, the host CPU 40 performs prediction calculation for the condition vector "X" and the error covariance matrix "P" according to the following equations (4) and (5) to calculate a prediction value "X⁻" of the condition vector and a prediction value "P⁻" of the error covariance matrix (step G3). In this case, prediction calculation is performed for the five-dimensional respective components of the condition vector "X" according to the following equations (6) through (10).

$$X^-(t) = \phi(t)X^+(t-1) \quad (4)$$

$$P^-(t) = \phi(t)P^+(t-1)\phi^T(t) + Q(t-1) \quad (5)$$

$$EastPos^- = EastPos^+ + dt \times Speed^+ \times \cos(Heading^+) \quad (6)$$

$$NorthPos^- = NorthPos^+ + dt \times Speed^+ \times \sin(Heading^+) \quad (7)$$

$$Speed^- = Speed^+ \quad (8)$$

$$Heading^- = Heading^+ + dt \times dHeading^+ \quad (9)$$

$$dHeading^- = dHeading^+ \quad (10)$$

In the respective equations, the subscript "−" indicates prediction value, the subscript "+" indicates correction value, and "T" indicates transposition matrix. Also, "$\phi$" indicates 5×5 matrix showing transition of the condition vector called condition transition matrix, and "Q" indicates 5×5 matrix showing covariance of error (model error) contained in KF model called system noise matrix. The condition transition matrix "$\phi$" may be matrix determined in advance. The system noise matrix "Q" is matrix set in the KF parameter setting process in step G9 at the time before the current time (last time).

Then, the host CPU 40 sets 5×1 matrix expressed in the following equation (11) containing components of the latest east position "EastPos", north position "NorthPos", and moving speed "Speed" on the position calculation plane of the mobile body stored in the measurement history data 905 of the RAM 90, and the latest azimuth "Heading" stored in the sensor data 901, and the azimuth per time "dHeading" calculated in step E9 as an observation vector "Z" for the KF position calculating process (step G5).

$$Z = \begin{pmatrix} EastPos \\ NorthPos \\ Speed \\ Heading \\ dHeading \end{pmatrix} \quad (11)$$

Also, the host CPU 40 multiplies the prediction value "X⁻" of the condition vector calculated in step G3 by predetermined observation matrix "H" to calculate a predicted observation vector (hereinafter referred to as "prediction observation vector") "HX⁻" (step G7).

The observation matrix "H" is matrix for predicting components of the observation vector "Z" including the east position "EastPos", north position "NorthPos", moving speed "Speed" on the position calculation plane, azimuth "Heading", and azimuth per time "dHeading" by using the respective components of the prediction value "X⁻" of the condition vector. The observation matrix "H" is 5×5 matrix, and the prediction value "X⁻" of the condition vector is 5×1 matrix. Thus, the prediction observation vector "HX⁻" can be obtained as 5×1 matrix.

Then, the host CPU 40 reads and executes the KF parameter setting program 807 stored in the ROM 80 to perform the KF parameter setting process (step G9).

Figure 25:
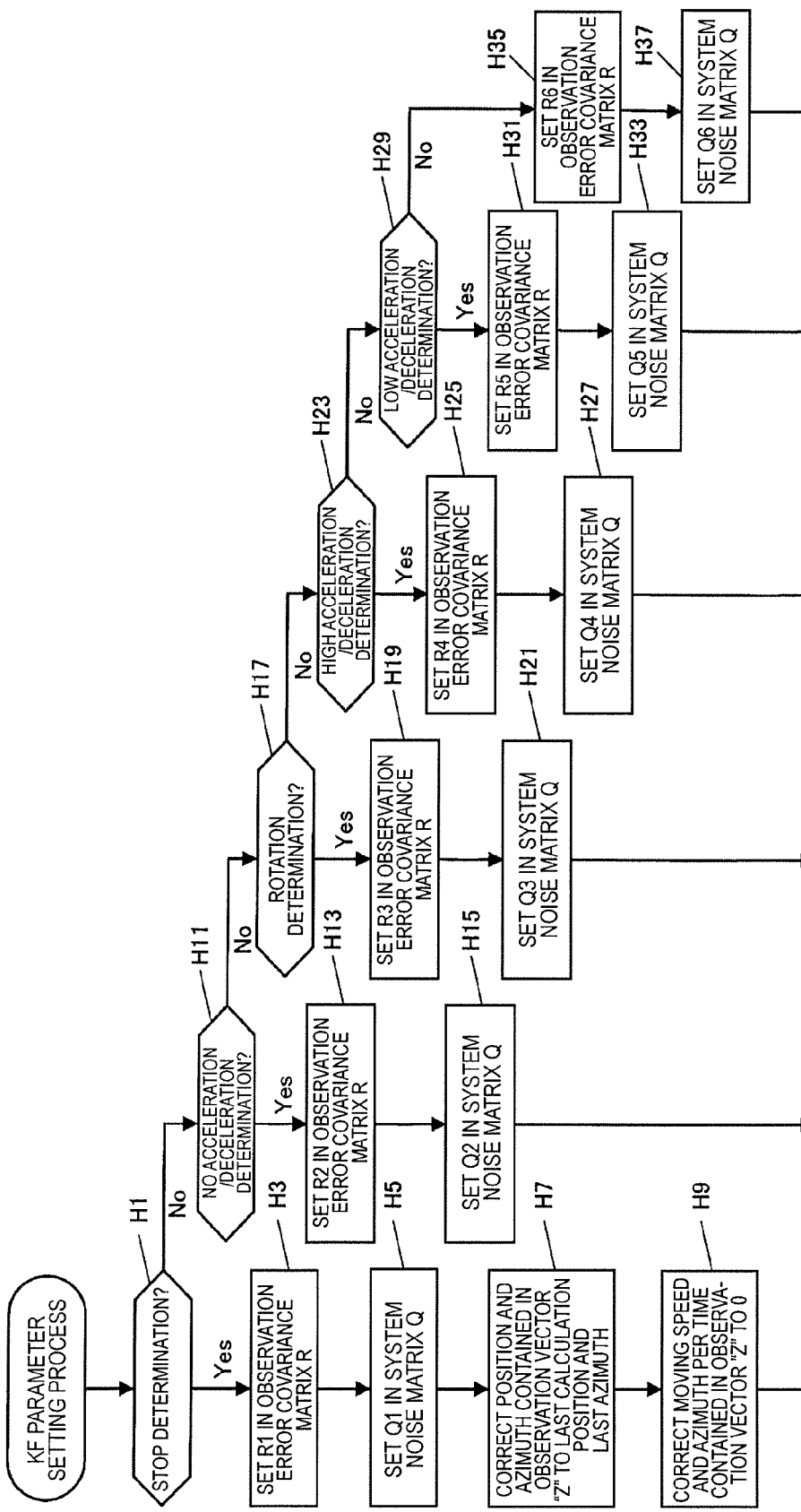
FIG. 25 is a flowchart showing flow of a KF parameter setting process.

FIG. 25 is a flowchart showing the flow of the KF parameter setting process.

Initially, the host CPU 40 determines whether the determination result in the stop determining process is "stop" or not (step H1). When it is determined that the determination result is "stop" (step H1; YES), the host CPU 40 sets "R1" expressed by the following equation (12) in the observation error covariance matrix "R" (step H3). Also, the host CPU 40 sets "Q1" expressed by the following equation (13) in the system noise matrix "Q" (step H5).

$$R1 = \begin{pmatrix} a1 & 0 & 0 & 0 & 0 \\ 0 & b1 & 0 & 0 & 0 \\ 0 & 0 & c1 & 0 & 0 \\ 0 & 0 & 0 & d1 & 0 \\ 0 & 0 & 0 & 0 & e1 \end{pmatrix} \quad (12)$$

$$Q1 = \begin{pmatrix} v1 & 0 & 0 & 0 & 0 \\ 0 & w1 & 0 & 0 & 0 \\ 0 & 0 & x1 & 0 & 0 \\ 0 & 0 & 0 & y1 & 0 \\ 0 & 0 & 0 & 0 & z1 \end{pmatrix} \quad (13)$$

The observation error covariance matrix "R" is 5×5 matrix showing error covariance of the respective components contained in the observation vector "Z", and the arrangements of the lines and rows correspond to the five components (east position, north position, moving speed, azimuth, and azimuth per time) of the observation vector "Z". The system noise matrix "Q" is 5×5 matrix showing model error of the KF model, and the arrangements of the lines and rows correspond to the five components (east position, north position, moving speed, azimuth, and azimuth per time) of the condition vector "X".

In this embodiment, only the diagonal components of the observation error covariance matrix "R" and the system noise matrix "Q" are positive values, and the other components are all "0". More specifically, in the observation error covariance matrix "R", parameters corresponding to the diagonal components of the five components of the east position, north position, moving speed, azimuth, and azimuth per time (hereinafter referred to as "east position error parameter", "north position error parameter", "speed error parameter", "azimuth error parameter", and "azimuth per time error parameter", and collectively referred to as "error parameter") are varied. The error parameters of the components considered to have small error (components having high reliability) are decreased, and the error parameters of the components considered to have large error (components having low reliability) are increased.

In the system noise matrix "Q", parameters corresponding to the diagonal components of the five components of the east position, north position, moving speed, azimuth, and azimuth per time (hereinafter referred to as "east position time-varying parameter", "north position time-varying parameter", "speed time-varying parameter", "azimuth time-varying parameter", and "azimuth per time time-varying parameter", and collectively referred to as "time-varying parameter") are varied. The time-varying parameters of the components desired to have small time-varying allowance (components desired to have small variance) are decreased, and the time-varying parameters of the components desired to have large time-varying allowance (components desired to have large variance) are increased.

When it is determined that the mobile body is in the stopping condition, the moving speed contained in the observation vector "Z" is corrected to "0" in step H9. Thus, the error for the moving speed is estimated as small error, and a speed error parameter "c1" contained in the observation error covariance matrix "R1" is set smaller than speed error parameters in the other moving conditions. In the equation (12), values are set as "a1=b1>d1>c1>e1", for example.

For increasing the time-varying allowance of the moving speed, a speed time-varying parameter "x1" contained in the system noise matrix "Q1" is set larger than speed time-varying parameters of the other moving conditions. In the equation (13), values are set as "z1<y1<v1=w1<x1", for example.

In the stopping condition, the azimuth per time is considered to be infinitely close to "0". Thus, an azimuth per time error parameter "e1" and an azimuth per time time-varying parameter "z1" are controlled in such a manner as to become the minimum.

Then, the host CPU 40 corrects the east position, north position, and azimuth contained in the observation vector "Z" to the east position, north position, and azimuth in the calculation before the current calculation (last calculation) (step H7). Also, the host CPU 40 corrects the moving speed and the azimuth per time contained in the observation vector "Z" to "0" (step H9). This step is performed for the reason that the position and azimuth of the mobile body are the same as those at the last position calculation and that the variances of the moving speed and azimuth are considered as "0" in case of stop condition determination. Then, the host CPU 40 ends the KF parameter setting process.

When it is determined that the determination result is not "stopping" in step H1 (step H1; NO), the host CPU 40 determines whether the determination result in the acceleration/deceleration determining process is "no acceleration/deceleration" or not (step H11). When it is determined that "no acceleration/deceleration" has been determined (step H11; YES), "R2" expressed in the following equation (14) is set in the observation error covariance matrix "R" (step H13). Also, "Q2" expressed in the following equation (15) is set in the system noise matrix "Q" (step H15).

$$R2 = \begin{pmatrix} a2 & 0 & 0 & 0 & 0 \\ 0 & b2 & 0 & 0 & 0 \\ 0 & 0 & c2 & 0 & 0 \\ 0 & 0 & 0 & d2 & 0 \\ 0 & 0 & 0 & 0 & e2 \end{pmatrix} \quad (14)$$

$$Q2 = \begin{pmatrix} v2 & 0 & 0 & 0 & 0 \\ 0 & w2 & 0 & 0 & 0 \\ 0 & 0 & x2 & 0 & 0 \\ 0 & 0 & 0 & y2 & 0 \\ 0 & 0 & 0 & 0 & z2 \end{pmatrix} \quad (15)$$

When it is determined that the mobile body is in the no acceleration/deceleration condition, it is estimated that the azimuth and the azimuth per time have small errors. Thus, values are set as "a2=b2>c2>d2>e2" in the equation (14), for example. For decreasing time-varying allowances of the azimuth and the azimuth per time, values are set as "v2=w2>x2>y2>z2" in the equation (15), for example. Then, the host CPU 40 ends the KF parameter setting process.

When it is determined that the determination result is not "no acceleration/deceleration" (step H11; NO), the host CPU 40 determines whether the determination result in the rotation determining process is "rotate" or not (step H17). When it is determined that the determination result is "rotate" (step H17; YES), "R3" expressed in the following equation (16) is set in the observation error covariance matrix "R" (step H19). Also, "Q3" expressed in the following equation (17) is set in the system noise matrix "Q" (step H21).

$$R3 = \begin{pmatrix} a3 & 0 & 0 & 0 & 0 \\ 0 & b3 & 0 & 0 & 0 \\ 0 & 0 & c3 & 0 & 0 \\ 0 & 0 & 0 & d3 & 0 \\ 0 & 0 & 0 & 0 & e3 \end{pmatrix} \quad (16)$$

$$Q3 = \begin{pmatrix} v3 & 0 & 0 & 0 & 0 \\ 0 & w3 & 0 & 0 & 0 \\ 0 & 0 & x3 & 0 & 0 \\ 0 & 0 & 0 & y3 & 0 \\ 0 & 0 & 0 & 0 & z3 \end{pmatrix} \quad (17)$$

When it is determined that the mobile body is in the rotating condition, it is estimated that the azimuth and the azimuth per time have small errors. Thus, an azimuth error parameter "d3" and an azimuth per time error parameter "e3" contained in the observation error covariance matrix "R3" are set smaller than azimuth error parameters and azimuth per time error parameters in the other moving conditions. In the equation (16), values are set as "a3=b3>c3>d3>e3", for example.

For increasing time-varying allowances of the position and azimuth, position time-varying parameters "v3, w3" and an azimuth time-varying parameter "y3" contained in the system noise matrix "Q3" are set larger than position time-varying parameters and azimuth time-varying parameters in the other moving conditions. In the equation (17), values are set as "v3=w3>x3=y3>z3", for example. Then, the host CPU 40 ends the KF parameter setting process.

When it is determined that the determination result is not "rotate" in step H17 (step H17; NO), the host CPU 40 determines whether the determination result in the acceleration/deceleration determining process is "high acceleration or high deceleration" or not (step H23). When it is determined that the determination result is "high acceleration or high deceleration" (step H23; YES), "R4" expressed in the following equation (18) is set in the observation error covariance matrix "R" (step H25). Also, "Q4" expressed in the following equation (19) is set in the system noise matrix "Q" (step H27).

$$R4 = \begin{pmatrix} a4 & 0 & 0 & 0 & 0 \\ 0 & b4 & 0 & 0 & 0 \\ 0 & 0 & c4 & 0 & 0 \\ 0 & 0 & 0 & d4 & 0 \\ 0 & 0 & 0 & 0 & e4 \end{pmatrix} \quad (18)$$

$$Q4 = \begin{pmatrix} v4 & 0 & 0 & 0 & 0 \\ 0 & w4 & 0 & 0 & 0 \\ 0 & 0 & x4 & 0 & 0 \\ 0 & 0 & 0 & y4 & 0 \\ 0 & 0 & 0 & 0 & z4 \end{pmatrix} \quad (19)$$

When it is determined that the mobile body is in the high acceleration/deceleration condition, it is estimated that the moving speed has large error. Thus, a speed error parameter "c4" contained in the observation error covariance matrix "R4" is set larger than speed error parameters in the other moving conditions. In the equation (18), values are set as "a4=b4=d4>c4=e4", for example.

For increasing time-varying allowances of the moving speed, a speed time-varying parameter "x4" contained in the system noise matrix "Q4" is set larger than speed time-varying parameters in the other moving conditions. In the equation (19), values are set as "v4=w4>x4>y4>z4", for example. Then, the host CPU 40 ends the KF parameter setting process.

When it is determined that the determination result is not "high acceleration or high deceleration" in step H23 (step H23; NO), the host CPU 40 determines whether the determination result in the acceleration/deceleration determining process is "low acceleration or low deceleration" or not (step H29). When it is determined that the determination result is "low acceleration or low deceleration" (step H29; YES), "R5" expressed in the following equation (20) is set in the observation error covariance matrix "R" (step H31). Also, "Q5" expressed in the following equation (21) is set in the system noise matrix "Q" (step H33).

$$Q4 = \begin{pmatrix} v4 & 0 & 0 & 0 & 0 \\ 0 & w4 & 0 & 0 & 0 \\ 0 & 0 & x4 & 0 & 0 \\ 0 & 0 & 0 & y4 & 0 \\ 0 & 0 & 0 & 0 & z4 \end{pmatrix} \quad (19)$$

$$R5 = \begin{pmatrix} a5 & 0 & 0 & 0 & 0 \\ 0 & b5 & 0 & 0 & 0 \\ 0 & 0 & c5 & 0 & 0 \\ 0 & 0 & 0 & d5 & 0 \\ 0 & 0 & 0 & 0 & e5 \end{pmatrix} \quad (20)$$

When it is determined that the mobile body is in the low acceleration/deceleration condition, it is estimated that the components other than the position have small errors. Thus, values are set as "a5=b5>c5>d5>e5" in the equation (20), for example. For decreasing time-varying allowances of the components other than the position, values are set as "v5=w5>x5>y5>z5" in the equation (21), for example. Then, the host CPU 40 ends the KF parameter setting process.

When it is determined that the determination result is not "low acceleration/deceleration" (step H29; NO), the host CPU 40 sets "R6" expressed in the following equation (22) in the observation error covariance matrix "R" (step H35). Also, the host CPU 40 sets "Q6" expressed in the following equation (23) in the system noise matrix "Q" (step H37).

$$R6 = \begin{pmatrix} a6 & 0 & 0 & 0 & 0 \\ 0 & b6 & 0 & 0 & 0 \\ 0 & 0 & c6 & 0 & 0 \\ 0 & 0 & 0 & d6 & 0 \\ 0 & 0 & 0 & 0 & e6 \end{pmatrix} \quad (22)$$

$$Q6 = \begin{pmatrix} v6 & 0 & 0 & 0 & 0 \\ 0 & w6 & 0 & 0 & 0 \\ 0 & 0 & x6 & 0 & 0 \\ 0 & 0 & 0 & y6 & 0 \\ 0 & 0 & 0 & 0 & z6 \end{pmatrix} \quad (23)$$

When the determination result does not correspond to any of "stop", "no acceleration/deceleration", "rotate", "high acceleration/deceleration", and "low acceleration/deceleration", it is determined that large position error and small azimuth and azimuth per time exist (since azimuth is detected by the azimuth sensor 75), values are set as "a6=b6>c6>d6>e6" in the equation (22), for example.

For increasing time-varying allowances of the position and azimuth per time, values are set as "v6=w6=z6>x6>y6" in the equation (23), for example. Then, the host CPU 40 ends the KF parameter setting process.

Returning to the KF position calculating process shown in FIG. 24, the host CPU 40 having finished the KF parameter setting process performs correction calculation for calculating the correction value "X⁺" of the condition vector and the correction value "P⁺" of the error covariance matrix according to the following equations (24) through (26) (step G11).

$$K(t) = P^-(t)H^T(t)[H(t)P^-(t)H^T(t)+R]^{-1} \quad (24)$$

$$X^+(t) = X^-(t) + K(t)V(t) = X^-(t) + K(t)[Z(t) - H(t)X^-(t)] \quad (25)$$

$$P^+(t) = [I - K(t)H(t)]P^-(t) \quad (26)$$

In these equations, "K" is 5×5 matrix called Kalman gain matrix, "R" is 5×5 observation error covariance matrix set by the KF parameter setting process, and "I" is unit matrix. After performing correction calculation, the host CPU 40 ends the KF position calculating process.

Returning to the position calculating process shown in FIG. 22, the host CPU 40 determines the positions expressed as east position "EastPos" and north position "NorthPos" contained in the correction value "X⁺" of the condition vector calculated in the KF position calculating process as output positions (step E13). Then, the host CPU 40 ends the position calculating process.

Returning to the main process in FIG. 18, the host CPU 40 having finished the position calculating process produces navigation screen where the output position is plotted and displays the navigation screen on the display unit 60 (step A13). Then, the host CPU 40 determines whether position calculation end command is issued from the user via the operation unit 50 (step A15). When it is determined that the position calculation end command is not issued (step A15; NO), the flow returns to step A1. When it is determined that the position calculation end command is issued (step A15; YES), the main process ends.

5. Operation and Advantage

According to this embodiment, the detection value agreement range of the acceleration sensor 71 of the sensor unit 70 is set for each of the possibility of moving, possibility of uncertainty, and possibility of stopping of the mobile body carrying or including the cellular phone 1. Also, the detection value agreement range of possibility of moving is set as the widest range for setting the membership function for stop determination of the mobile body. Then, it is determined whether the mobile body is in the stopping condition or not by the fuzzy inference calculation using the membership function, and the values of the observation error covariance "R" and the system noise matrix "Q" as the error parameters used for the position calculation using Kalman filter are varied depending on whether determination that the mobile body is in the stopping condition is made or not. Then, the position of the mobile body calculated by the position calculation process using the least squared method is corrected by the position calculating process using Kalman filter to determine the output position.

In the fuzzy inference calculation, the membership function having the detection value agreement range for the possibility of moving as the widest range is used based on the consideration that the moving condition of the mobile body occurs more frequently than the stopping condition. Whether the mobile body is in the stopping condition or not can be adequately determined by performing fuzzy inference calculation according to the detection result of the sensor unit. Then, the position is corrected by the Kalman filter process using changed error parameters for the Kalman filter process when the stopping condition is determined to achieve highly accurate position calculation.

According to this embodiment, the rotation angles around the three axes including the rotation angle in the yaw direction of the mobile body are detected by the gyro sensor 73. Then, the agreement range of the rotation angle detection value of the gyro sensor 73 is set for each of the possibility of rotating, possibility of uncertainty, and possibility of linearly moving of the mobile body. Also, the agreement range of the rotation angle detection value in the yaw direction for the possibility of rotating is set as the widest range for setting the membership function in rotation determining process. Then, it is determined whether the mobile body is in the rotating condition or not by the predetermined fuzzy inference calculation using the membership function for rotation determination process, and the error parameters used for the position calculating process using Kalman filter are varied depending on whether determination that the mobile body is in the rotating condition is made or not.

In most cases, the mobile body is considered to rotate around the yaw axis. Thus, by setting the agreement range of the rotation angle detection value in the yaw direction as the widest range for the possibility of rotating, whether the mobile body is rotating or not can be easily determined when the mobile body is rotating around the yaw axis. Moreover, by performing the position calculating process using Kalman filter while varying the error parameters depending on whether the mobile body is rotating or not, accuracy in position calculation further increases.

6. Modified Example

6-1. Portable Navigation System

The invention is applicable to a "portable navigation system" attachable and detachable to and from a mobile body such as an automobile and a motorcycle.

6-2. Electronic Device

The invention is also applicable to any types of electronic device including a position calculating device as well as the cellular phone. For example, the invention can be applied to a portable type personal computer, a PDA (personal digital assistant), and a car navigation system.

6-3. Satellite Positioning System

While the GPS has been used as a satellite positioning system in this embodiment, other satellite positioning systems such as WAAS (wide area augmentation system), QZSS (quasi zenith satellite system), GLONASS (global navigation satellite system), and GALILEO may be used.

6-4. Division of Process

Apart or all of the processes performed by the host CPU 40 may be performed by the calculation control unit 31 of the baseband processing circuit unit 30. For example, the calculation control unit 31 executes position calculating process by using measurement actual values calculated by the measurement acquisition calculating unit 33. Also, the calculation control unit 31 may perform all of the processes including the stop determining process, rotation determining process, and acceleration/deceleration determining process.

6-5. Basic KF Position Calculating process

According to this embodiment, the position and moving speed of the mobile body as observation information for the KF position calculating process are calculated by executing the LS position calculating process. However, the observation information may be calculated by executing position calculating process using Kalman filter instead of the LS position calculating process. In this case, basic KF position calculating program is stored in the ROM 80 instead of the LS position calculating program 805, and the host CPU 40 reads and executes the basic KF position calculating program in step E1 of the position calculating process shown in FIG. 22 to perform the basic KF position calculating process.

Figure 26:
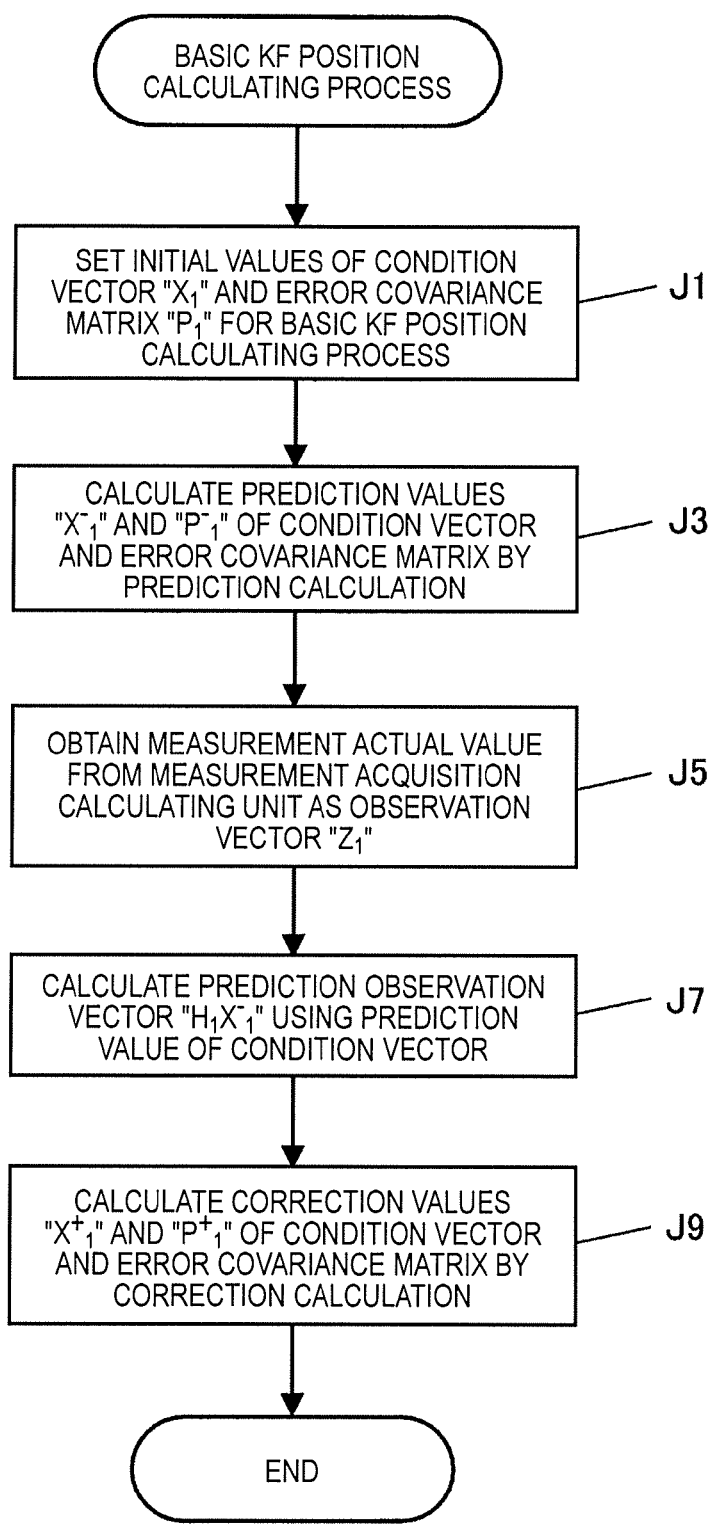
FIG. 26 is a flowchart showing flow of a basic KF position calculating process.

FIG. 26 is a flowchart showing the flow of the basic KF position calculating process.

Initially, the host CPU 40 sets initial values of a condition vector "$X_1$" and an error covariance matrix "$P_1$" for the basic KF position calculating process (step J1). In the basic KF position calculating process, the condition vector "$X_1$" may be 8×1 matrix containing components of the three-dimensional position vector, three-dimensional moving speed vector, clock bias, and clock drift of the cellular phone 1 in the ECEF coordinate system.

Then, the host CPU 40 performs prediction calculation according to the equations (4) and (5) to calculate a prediction value "$X_1^-$" of the condition vector and a prediction value "$P_1^-$" of the error covariance matrix (step J3). Then, the host CPU 40 obtains the reception frequency and code phase of the GPS satellite signal (measurement actual value) from the measurement acquisition calculating unit 33 as 2×1 observation vector "$Z_1$" (step J5). In the basic KF position calculating process, Kalman filter process is executed using reception frequency and code phase as observation information.

Then, the host CPU 40 calculates a prediction observation vector "$H_1 X^{1-}$" using the prediction value "$X_1^-$" of the condition vector and predetermined observation matrix "$H_1$" (step J7). The observation matrix "$H_1$" is matrix for predicting reception frequency and code phase as components of the observation vector "$Z_1$" by using the respective components of the prediction value "$X_1^-$" of the condition vector. The observation matrix "$H_1$" is 2×8 matrix, and the prediction value "$X_1^-$" of the condition vector is 8×1 matrix. Thus, the prediction observation vector "$H_1X_1^-$" becomes 2×1 matrix.

Then, the host CPU 40 performs the correction calculation according to the equations (24) through (26) to calculate a prediction value "$X_1^+$" of the condition vector and a prediction value "$P_1^+$" of the error covariance matrix (step J9). Then, the host CPU 40 ends the basic KF position calculating process.

The host CPU 40 having finished the basic KF position calculating process performs coordinate transformation calculation for the position vector and moving speed vector in the ECEF coordinate system contained in the obtained correction value "$X_1^+$" of the condition vector to calculate the position and moving speed in the ENU coordinate system. Then, the host CPU 40 performs the KF position calculating process shown in FIG. 24 by using the calculated position and moving speed and the azimuth detected by the azimuth sensor 75 and the azimuth per time calculated based on the azimuth as the observation information.

In this case, the output position is determined by two-stage Kalman filter process constituted by the basic KF position calculating process and the KF position calculating process. Alternatively, the observation information for the KF position calculating process can be calculated by using inertial navigation system calculation process, for example. As can be understood, the observation information calculation method may be arbitrarily changed.

6-6. Position Jump Determination

It is possible to determine position jump in the KF position calculating process and control the KF parameters based on the determination result. More specifically, a position jump determining program is stored in the ROM 80 as sub routine of the main program 800. Then, the host CPU 40 reads and executes the position jump determining program to perform the position jump determining process after finishing the KF parameter setting process in step G9 of the KF position calculating process shown in FIG. 24.

Figure 27:
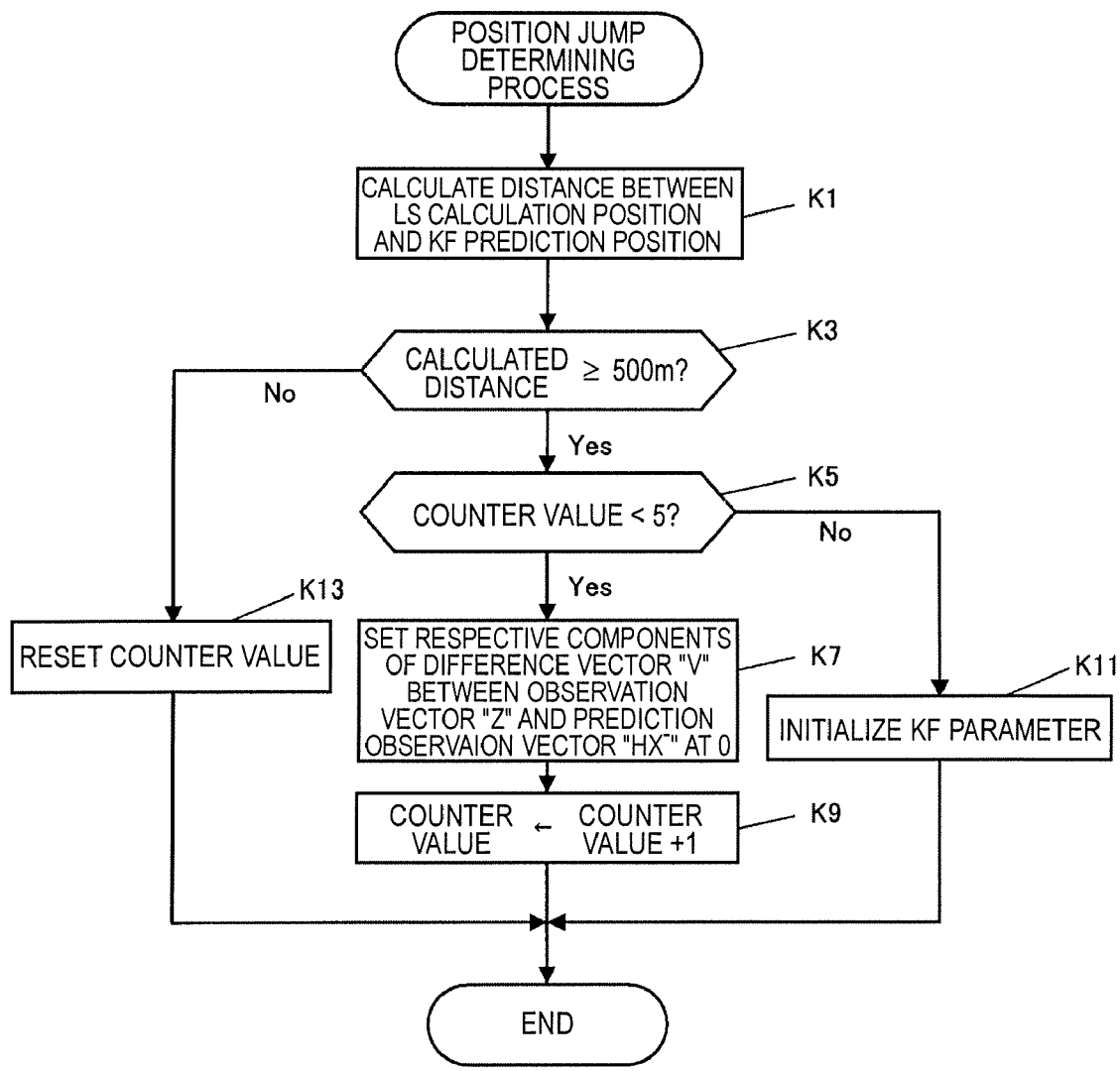
FIG. 27 is a flowchart showing flow of a position jump determining process.

FIG. 27 is a flowchart showing the flow of the position jump determining process.

Initially, the host CPU 40 calculates the distance between a position represented by the east position and the north position calculated in step E3 of the position calculating process shown in FIG. 22 (hereinafter referred to as "LS calculation position") and a position represented by the east position and the north position contained in the prediction value "$X^-$" of the condition vector obtained in the prediction calculation in step G3 of the KF position calculating process shown in FIG. 24 (hereinafter referred to as "KF prediction position" (step K1).

Then, the host CPU 40 determines whether the distance between the LS calculation position and the KF prediction position calculated in step K1 is "500 m" or longer or not (step K3). When it is determined that the distance is "500 m" or longer (step K3; YES), it is further determined whether a counter value for position jump determination is smaller than "5" or not based on the determination that position jump has occurred (step K5).

Then, the counter value is smaller than "5" (step K5; YES), the host CPU 40 sets the respective components (south position, north position, moving speed, azimuth, and azimuth per time) contained in a difference vector "$V=Z-HX^-$" showing the difference between the observation vector "$Z$" and the prediction observation vector "$HX^-$" at "0" (step K7).

As apparent from the equation (25), the second term on the right side is "0" when the difference vector "V" is "0". In this case, the prediction value "$X^-$" of the condition vector becomes the correction value "$X^+$". Thus, when occurrence of position jump is determined, the prediction position calculated by the prediction calculation is established as the output position.

Then, the host CPU 40 increments the counter value (step K9), and ends the position jump determining process. When it is determined that the counter value is "5" or larger in step K5 (step K5; NO), the host CPU 40 initializes the KF parameters (step K11). When position jump is successively detected more than a predetermined number of times, there is a possibility that the KF parameters are not set at appropriate values. Thus, the KF parameters are initialized in this step. Then, the host CPU 40 ends the position jump determining process.

When it is determined that the distance between the LS calculating position and the KF prediction position is shorter than "500 m" (step K3; NO), the host CPU 40 resets the counter value (step K13) and ends the position jump determining process.

6-7. Calculation of Azimuth

According to this embodiment, the azimuth detected by the azimuth sensor 75 and azimuth per time calculated from variance of the azimuth with time are used as observation information. However, the azimuth may be calculated by using the moving speed vector obtained by the LS position calculating process. More specifically, the azimuth "Heading" on the position calculation plane is calculated according to the following equation (27) by using the east moving speed "EastVel" and the north moving speed "Northvel".

$$\text{Heading} = \arctan\left(\frac{EastVel}{NorthVel}\right) \quad (27)$$

When the azimuth of the mobile body is calculated by this method, the necessity for providing the azimuth sensor 75 on the cellular phone 1 is eliminated.

What is claimed is:

1. A position calculating method performed by a position calculating device having a sensor unit which includes an acceleration sensor carried by or mounted on a mobile body and moving with the mobile body, comprising:
    calculating the position of the mobile body;
    establishing a membership function by setting a detection value agreement range of the sensor unit for each of the possibility of moving, possibility of uncertainty, and possibility of stopping of the mobile body;
    determining whether the mobile body is in the stopping condition by predetermined fuzzy inference calculation using the membership function;
    changing an error parameter used for predetermined Kalman filter process to correct the calculated position by the Kalman filter process according to whether the stopping condition of the mobile body is determined or not; and
    correcting the calculated position by the Kalman filter process.

2. The position calculating method according to claim 1, wherein determining whether the mobile body is in the stopping condition or not is determined based on the estimation whether the mobile body is continuously in the stopping condition or not when the predetermined fuzzy inference calculation is repeatedly executed.

3. The position calculating method according to claim 1, further comprising:
    determining the gravity direction based on the detection value of the sensor unit when the mobile body is in the stopping condition.

4. The position calculating method according to claim 1, wherein
the sensor unit has a gyro sensor; and
the method further includes
determining whether the mobile body is in the rotating condition or not based on the detection result of the sensor unit, and
changing the error parameter according to the determination whether the mobile body is in the rotating condition.

5. The position calculating method according to claim 4, wherein
the gyro sensor detects a plurality of rotation angles including the rotation angle in the yaw direction of the mobile body;
the method further includes establishing a membership function for rotation determination by setting the agreement range of the rotation angle detection value of the gyro sensor for each of the possibility of rotating, possibility of uncertainty, possibility of linearly moving of the mobile body; and
determining whether the mobile body is in the rotating condition or not includes determining whether the mobile body is in the rotating condition or not based on predetermined fuzzy inference calculation using the membership function for rotation determination.

6. The position calculating method according to claim 1, wherein
the acceleration sensor detects at least acceleration in the front direction of the mobile body; and
the method further includes
determining acceleration and deceleration of the mobile body and the level of the acceleration and deceleration based on the acceleration in the front direction detected by the acceleration sensor, and
changing the error parameter according to the acceleration and deceleration of the mobile body and the level of the acceleration and deceleration.

7. The position calculating method according to claim 6, further comprising:
calibrating the acceleration detection value in the front direction of the acceleration sensor when it is determined that the mobile body is in the stopping condition.

8. A position calculating device carried by or mounted on a mobile body and moving with the mobile body, comprising:
a calculating unit which calculates the position of the mobile body;
a sensor unit which includes at least an acceleration sensor;
a membership function setting unit which establishes a membership function by setting a detection value agreement range of the sensor unit for each of the possibility of moving, possibility of uncertainty, and possibility of stopping of the mobile body;
a determining unit which determines whether the mobile body is in the stopping condition by predetermined fuzzy inference calculation using the membership function;
a changing unit which changes an error parameter used for predetermined Kalman filter process to correct the position calculated by the calculating unit by the Kalman filter process according to whether the stopping condition of the mobile body is determined or not; and
a correcting unit which corrects the position calculated by the calculating unit by the Kalman filter process.

* * * * *